(12) United States Patent
Csengeri

(10) Patent No.: US 6,533,120 B1
(45) Date of Patent: Mar. 18, 2003

(54) MULTI-LEVEL EATING SURFACE APPARATUS AND METHOD

(76) Inventor: Paul James Csengeri, 613 Paseo De Los Reyes, Redondo Beach, CA (US) 90277

( * ) Notice: Subject to any disclaimer, the term of this patent is extended or adjusted under 35 U.S.C. 154(b) by 7 days.

(21) Appl. No.: 09/677,704

(22) Filed: Sep. 30, 2000

Related U.S. Application Data

(63) Continuation-in-part of application No. 09/243,357, filed on Feb. 1, 1999, now Pat. No. 6,149,011.

(51) Int. Cl.$^7$ .......................... B65D 1/34; A47G 29/00; A47G 19/00
(52) U.S. Cl. ..................................... 206/565; 220/575
(58) Field of Search .................... 220/574, 575, 220/574.3, 914; 206/553, 557, 558, 565, 564; D7/551.3, 552.2, 558, 559

(56) References Cited

U.S. PATENT DOCUMENTS

| | | | | |
|---|---|---|---|---|
| 421,264 | A | * 2/1890 | Gibbons | 220/575 |
| 1,607,863 | A | * 11/1926 | Betts | 220/574 |
| 2,582,183 | A | * 1/1952 | Weidler | 220/574 |
| 2,709,904 | A | * 6/1955 | Boughton | 220/575 |
| D199,629 | S | * 11/1964 | Castrinos | D7/551.3 |
| 3,791,550 | A | * 2/1974 | Duncan | 220/23.86 |
| 3,894,649 | A | * 7/1975 | Nicholl | 220/23.83 |
| 4,534,469 | A | * 8/1985 | Elsmo | 206/553 |
| D311,828 | S | * 11/1990 | Clark et al. | D7/552.2 |

FOREIGN PATENT DOCUMENTS

FR 2 631 222 * 11/1989 .................. 220/574

* cited by examiner

*Primary Examiner*—Bryon P. Gehman
(74) *Attorney, Agent, or Firm*—Dorothy S. Morse

(57) ABSTRACT

A apparatus with multiple-level eating surfaces, which can be made as separable modular units, or molded units having one-piece construction. Although it is preferable for the molded and modular units to be reusable, they could also be discarded or recycled after a small number of uses. Modular and molded units typically have a plate-like or tray-like base member, one or more support structures having uniform or differing heights, and several elevated eating surfaces or compartments each supported by at least one support structure. The support structures can be narrow and pillar-like, broad and platform-like, or contoured structures having 3-D relief. Liners/inserts can be used to vertically extend the food-holding capacity of any eating surface or food-holding compartment. Since the present invention provides an enhanced amount of eating surface area while maintaining a compact footprint, applications may include, but are not limited to, use where table space is limited and does not allow the use of separate salad and dessert plates, use for transporting more food items during each trip to a buffet table without enlarging the size of the plate-like or tray-like base member people would have to carry, use in providing a dining plate or tray that maintains separate compartments for foods without undue plate-like base member enlargement of the base member perimeter, and use as a reward system for children to teach them to eat new foods by offering them a fun way to work their way up to a reward or dessert.

19 Claims, 22 Drawing Sheets

MULTI-LEVEL EATING SURFACE APPARATUS AND METHOD

This application is a continuation-in-part of U.S. patent application Ser. No. 09/243,357, filed Feb. 1, 1999, now U.S. Pat. No. 6,149,011.

BACKGROUND—FIELD OF INVENTION

This invention relates to dining plates and trays, specifically to an apparatus having multiple-level eating surfaces that are intended for use by an individual for the convenient transport and eating of a variety of foods. The various embodiments are configured to retain at least some of the food it supports within separate eating surfaces or compartments, some elevated relative to the others, and to provide an advantage over prior art eating devices by creating an enhanced amount of eating surface area in combination with a space-conserving footprint. Some of the embodiments of the present invention are made from separable modular units, while it is contemplated for other embodiments to be made as molded units having a one-piece construction. Although it is generally intended for both the modular and molded embodiments to be reusable, it is also considered within the scope of the present invention for any embodiment to be disposable and/or recycled after only one or a small number of uses. The modular and molded embodiments of the present invention have a base member in the form of a plate-like or tray-like structure that provides at least one lower eating surface, at least one eating surface in an elevated position relative to the base member, and one or more support members upwardly depending from the base member or a second pillar-like or platform-like support member in an inferior position beneath it, with each elevated eating surface being attached to one or more support members. The elevated eating surfaces used in a single embodiment can vary in shape and size, and be plate-like, tray-like, platform-like, multi-tiered, or bowl-like. Also, the support members in each embodiment can differ in height, be identical or varied in configuration, narrow in construction and pillar-like, broadly constructed and platform-like, or contoured having 3-D relief and being in the form of animals or other three-dimensional objects relating to a decorative theme. Liquid-resistant or grease-resistant liners/inserts can be optionally used with the elevated eating surfaces to vertically extend their food-holding capacity. It is also contemplated for a beverage or food container, including but not limited to bowls or cups for soup, dips, sauces, as well as containers for food items eaten with ones fingers such as small pieces of fruit and cut vegetables, shrimp, cheese cubes, breadsticks, or french fries, to be optionally supported in a secure upright orientation by the plate-like base member, one of the support members, or both. Applications may include, but are not limited to, use to provide an enhanced amount of eating surface area where table space is limited and does not allow the use of separate salad and dessert plates during a meal, use at buffets for the separation and transport of more food items during each trip to a buffet table without enlarging the perimeter of the plate-like or tray-like base member people would have to carry, general use in providing a dining plate or tray that maintains separate compartments for foods without having to enlarge the perimeter of the base member to accomplish such food separation, use as a fun way to present food to children to encourage them to eat new foods while they work their way up to a dessert food item, and further as a learning tool for children when they are taught how to assemble the elevated eating surfaces upon the plate-like or tray-like base member, and when numerical markings on the eating surfaces are used by the children to earn points or select a hidden compartment to find a reward or prize.

BACKGROUND—DESCRIPTION OF PRIOR ART

Serving dishes having multiple-levels are known for use in buffets to artistically display arrays of food items from which guests can make their food selections. Multi-tiered structures used in homes and public facilities, for attractively displaying desserts or hors d'oeuvres, generally have a support system rigidly connecting together two or three plates of similar or upwardly decreasing size in a fixed position one above the other. The support systems are often centrally located with a support rod being attached to a decorative upper handle, particularly where upper plates are diminished in size relative to the lower plates, although some can comprise an array of decorative perimeter supports to place the plates in a spaced-apart configuration from one another. Family members and guests as a group are able to select food items one at a time from the different levels of these tiered structures for immediate consumption or transfer onto individual plates for later consumption. Compartmentalized single-level plates, made from ceramic, paper, and plastic, are also known which separate foods to minimize the mixing of food flavors and in addition so that the excess liquid from less solid foods does not contact and saturate adjacent dry foods, such as pieces of bread or other baked items, making them less desirable to eat. Plates are also known which have surface indentations of differing depths that are configured for the placement of a container for a beverage or soup to help maintain the container in an upright position during transport and eating. However, it is not known to have multiple-level eating devices for individual use that are fun to use and have all of the advantages disclosed herein by the different embodiments of the present invention.

SUMMARY OF INVENTION—OBJECTS AND ADVANTAGES

It is the primary object of this invention to provide multiple-level dining plates and trays for individual use in the transport and eating of food that maintain a space-conserving footprint while offering an enhanced amount of food placement surface area. It is a further object of this invention to provide multiple-level individual dining plates and trays that are designed for easy construction and cost-effective use. It is also an object of this invention to provide multiple-level dining plates and trays for individual use that are suitable for disposal and/or recycling after a single use or a small number of uses, or in the alternative can be manufactured so as to be easily cleaned for repeated reuse. A further object of this invention is to provide multiple-level individual dining plates and trays that are configured for compact storage when not in use. It is also an object of this invention to provide multiple-level individual dining plates and trays that are fun to use by both adults and children and can be used to teach children to eat new foods by having them earn a dessert through the accumulation of points or otherwise working their way up to a dessert or other reward. A further object of this invention is to provide multiple-level dining plates and trays for individual use which are compartmentalized to prevent the mixing of foods in such instances where mixing would be undesirable, to include any combination of compartmentalized base members, compartmentalized support members, and compartmentalized elevated eating surfaces. It is also an object of this invention to provide multiple-level individual dining plates and trays which have one or more one secret compartments and may also have quick release means to attach utensils, toys, or other objects such as a napkin to its upper surface for safekeeping during transport. It is also a further object of this invention to provide multiple-level individual dining plates and trays with optional means for bracing the base member when required to finish additional support and balance to food-laden elevated eating surfaces. A further object of this invention is to provide multiple-level individual dining plates and trays which are designed with surfaces areas suitable for the attachment of decorative and advertisement indicia.

As described herein, properly manufactured, assembled and used, the present invention would provide a fun-to-use, versatile eating surface that would offer different levels upon which food could be served to an individual. Elevated food eating surfaces attached to and/or positioned above a plate-like or tray-like base member would increase the surface area available for food placement without at the same time increasing the amount of table space required by the individual to support the food until it is consumed. Also, the upper food holding surfaces could be used to separate foods from one another when doing so would improve its presentation, as well as enjoyment by the individual. The upper food holding surfaces, as well as the plate-like and tray-like base members, could be compartmentalized for further food separation purposes. The present invention could be made as an easily reusable modular device with separable components that allow easy cleaning and efficient storage, or as a convenient-to-use reusable one-piece molded device, although it is also considered to be within the scope of the present invention to have both molded and modular embodiments made from less expensive materials to allow disposal and/or recycling of the present invention after a single use or a small number of uses.

Although a variety of materials, such as but not limited to glass, plastic, ceramics, metal, and wood, can be used for manufacture of the present invention, at least for buffet use when a lightweight and easy-to-carry device is desired, the present invention would preferably be made from plastic. The preferred embodiments of the present invention can comprise a selection of components having various sizes, colors, and perimeter configurations. All embodiments with two or more elevated eating surfaces can also have pillar-like or platform-like support members placing elevated eating surfaces at a uniform height or at differing heights. When elevated eating surfaces are used and positioned at different heights relative to one another, the present invention can be used to teach children to eat new foods by making them work their way up to a reward or dessert located on the eating surface having the highest elevated position. The multiple levels also make the present invention toy-like and therefore useful as a learning tool that captures the interest of children, particularly when surface decoration would include 3-D relief in the form of a person, animal, or character familiar to the child. Batteries or other type of renewable power supply could be positioned within one of the pillars or platforms to further enhance the teaching value of the present invention by turning it into a talking character that presented safety-related or other important messages to children. All surface areas in each of the embodiments can be decorated with markings relating to many diverse topics, such as but not limited to a movie promotion, business logo, advertising campaign, or holiday theme, and it is contemplated that such decoration could be contoured to provide 3-D relief. Also, it is contemplated for the modular and molded embodiments to optionally contain quick-release fasteners configured for the attachment of utensils, a napkin, or toy, as well as clip-on tabs which brace the base member in an outrigger type of function. Also, when molded or clip-on tabs support pillars or platforms that otherwise would have been positioned on the base member's top surface, they increase the food-holding capacity of the base member. Further, preferred embodiments of the present invention can optionally comprise one or more liquid-resistant or grease-resistant compartment liners and/or inserts adapted for holding a beverage, sauce, or soup, as well as soft foods such as applesauce, cottage cheese, or pudding, and foods intended for eating with one's fingers such as small pieces of fruit and cut vegetables, shrimp, cheese cubes, breadsticks, or french fries. The pillars or platforms can also comprise one or more hidden compartments for the retention of a condiment, toy, prize, reward, or other surprise.

The description herein provides preferred embodiments of the present invention but should not be construed as limiting the scope of the multiple-level eating surface invention. For example, variations in the number of support members and elevated eating surfaces used with each base member; the number and placement of hidden compartments used; the height and configuration of the support members used; the angle at which the elevated eating surfaces are positioned relative to the base member; the perimeter configuration of the base member; the number, shape, and size of the food retaining indentations formed into the base member; the number of quick-release fasteners optionally used to attach utensils and toy-like objects to the base member; the presence of a compartment, indentation, ridge, or designated site for secure upright positioning of a container for beverage or soup; the number of clip-on tabs used; and the configuration of a pattern of interlocking members optionally used to connect the elevated eating surfaces, the support members, and the base member in modular embodiments, other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 4:
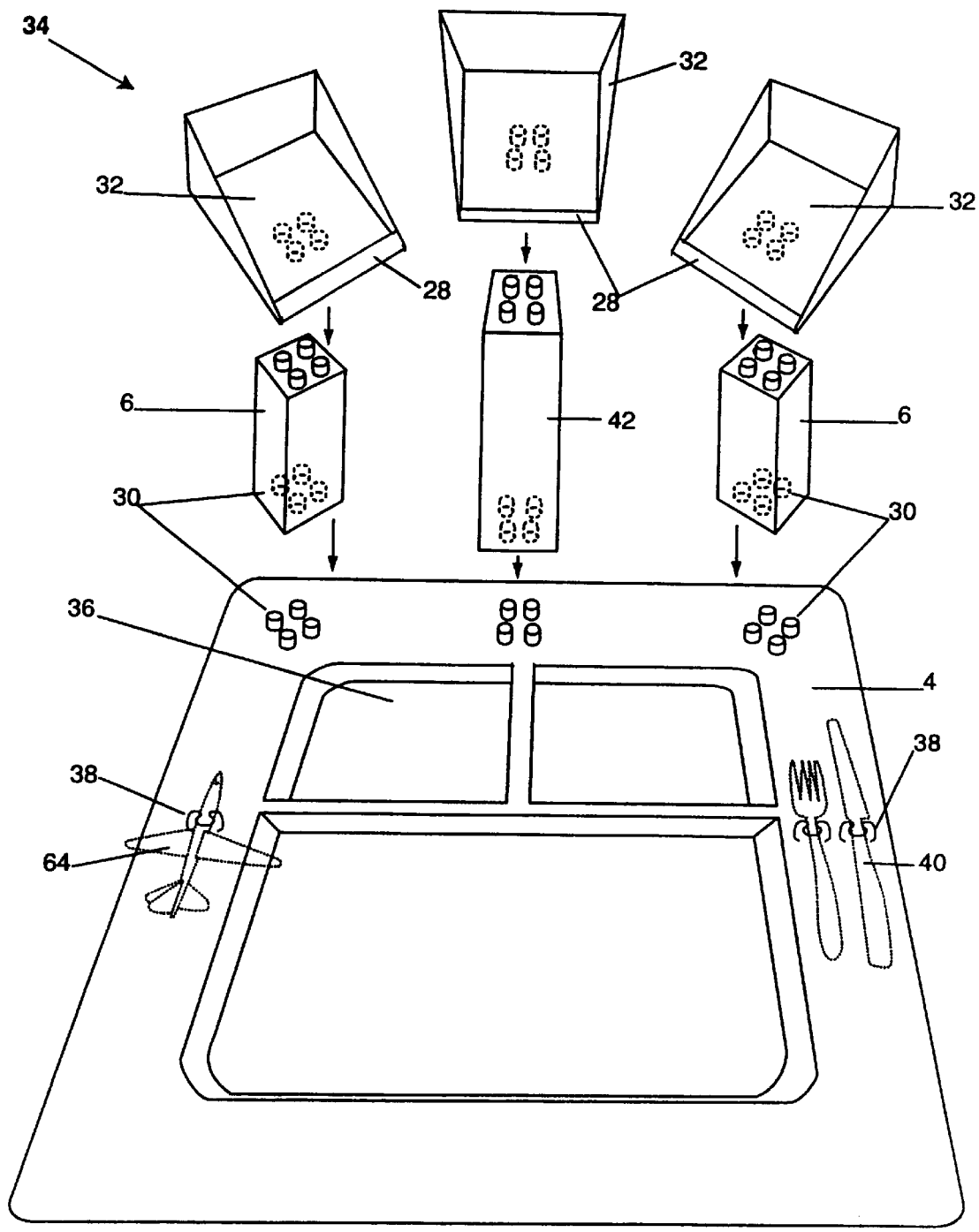
FIG. 4 is an exploded front perspective view of a fourth preferred embodiment of the present invention having either modular components poised for assembly, including three tray-like elevated eating surfaces each having side and back walls and being poised for attachment to the top surface of a compartmentalized plate-like base member in an aligned position remote from a user, with a pillar-like support member being used to connect each of the elevated eating surfaces to the plate-like base member, the elevated eating surfaces being dimensioned for holding a beverage or soup container, food, or a small toy, and the plate-like base member having fastening means laterally on its top surface for the attachment of utensils and/or toy-sized objects.
Figure 5:
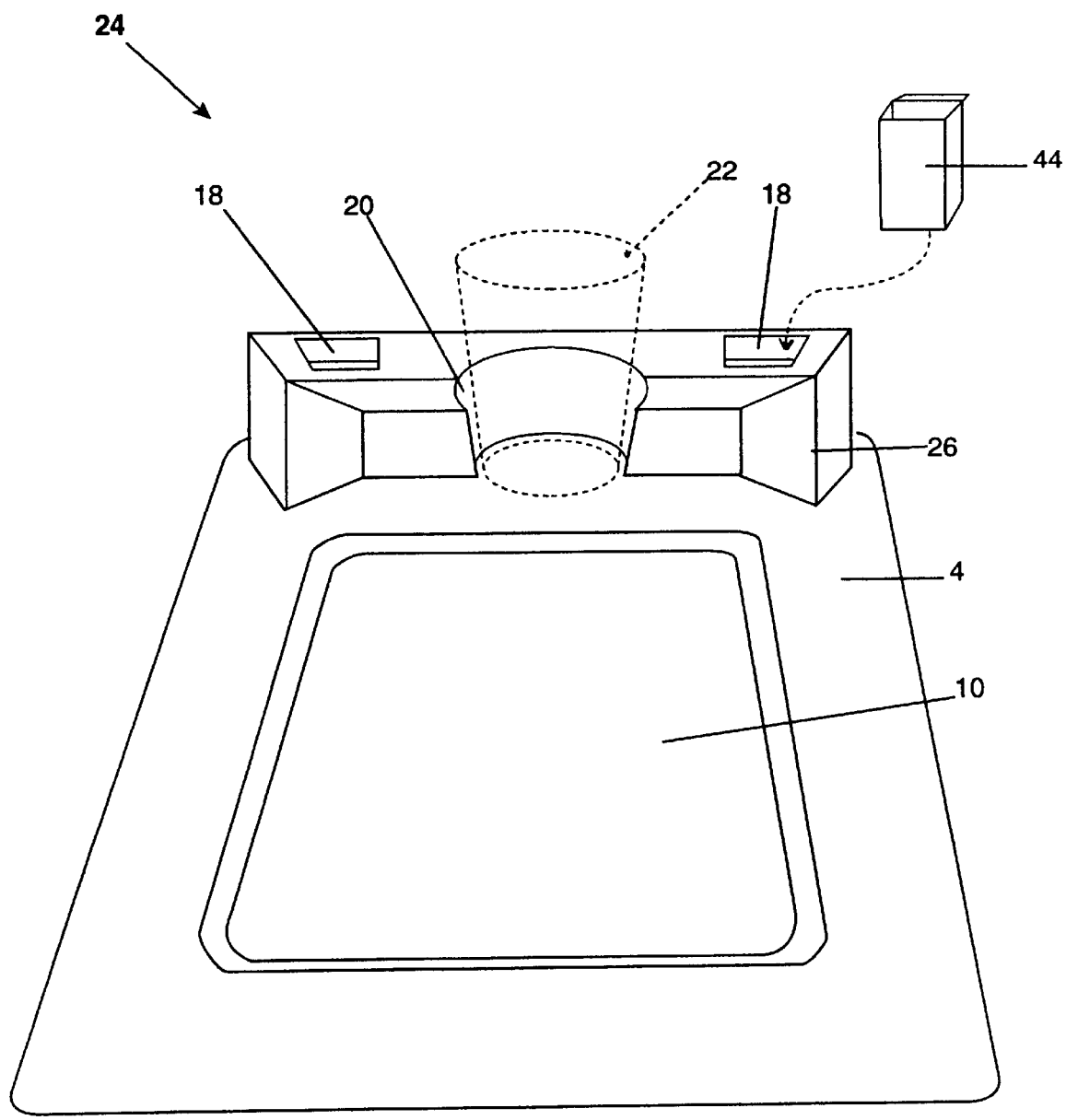
FIG. 5 is a front perspective view of the third preferred embodiment of the present invention having an insert/liner poised for insertion into one of its laterally positioned compartments.
Figure 6:
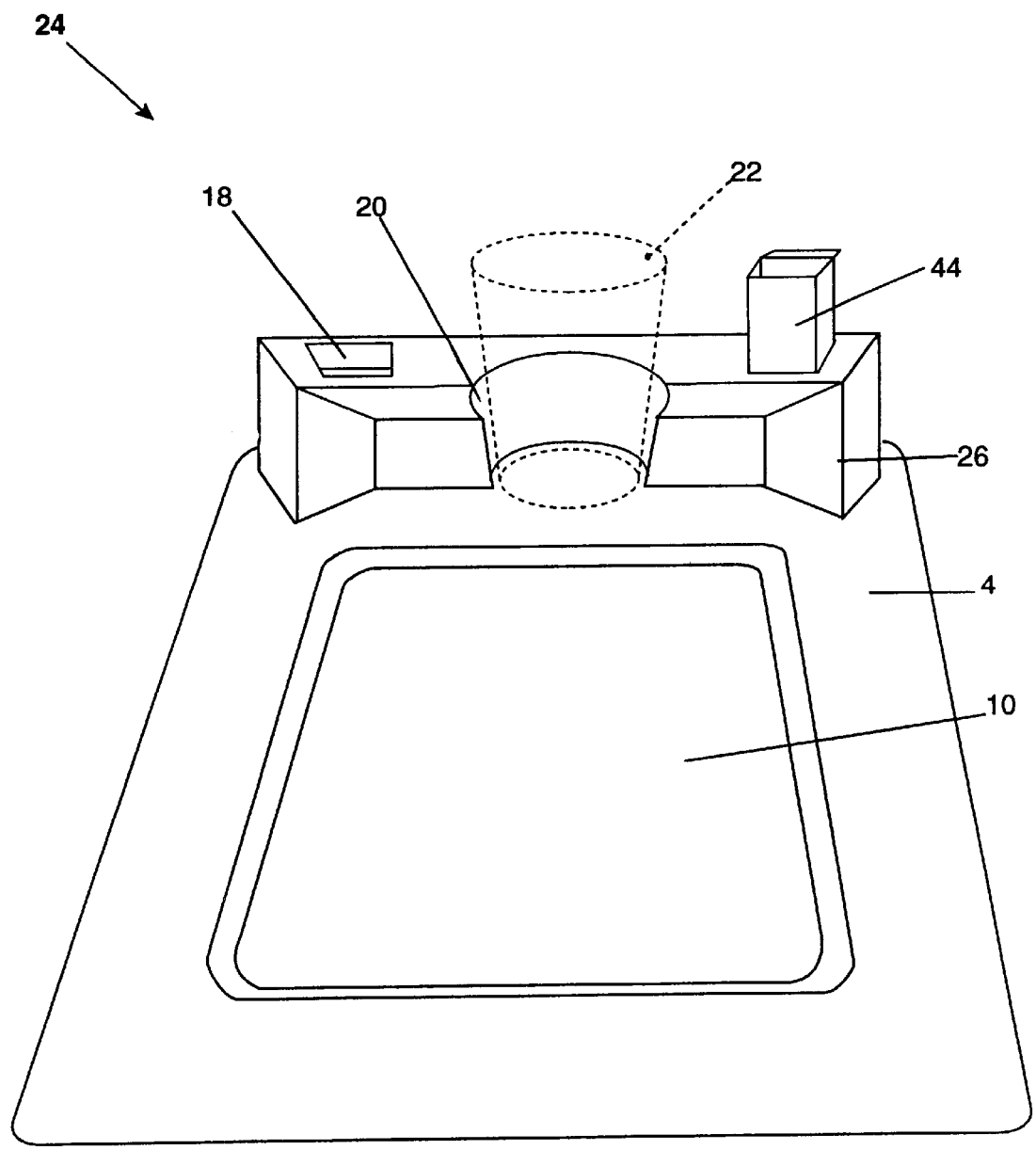
FIG. 6 is a front perspective view of the third preferred embodiment of the present invention having an insert/liner in a position of use within one of its laterally positioned compartments.
Figure 7:
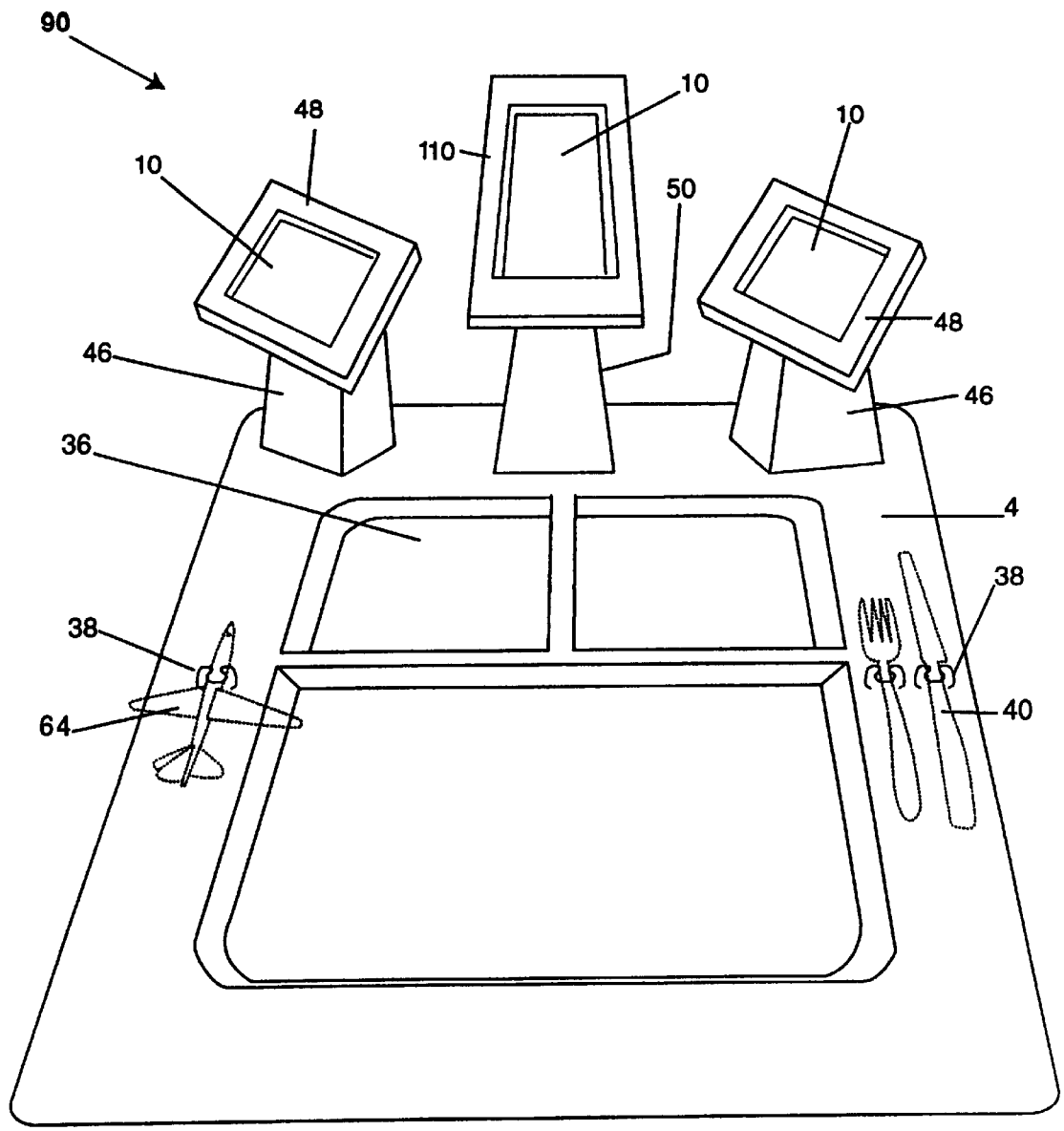
FIG. 7 is a front perspective view of a fifth preferred embodiment of the present invention having either modular components including three substantially planar elevated eating surfaces without perimeter walls, each attached to the top surface of a compartmentalized plate-like base member by a stackable pillar-like support member having a flared bottom edge, the plate-like elevated eating surfaces being in a substantially aligned position remote from a user, the elevated eating surfaces each having a central indentation for holding a beverage or soup container, food, or a small toy, the plate-like base member having fastening means laterally on its top surface for the attachment of utensils and/or toy-sized objects.
Figure 8:
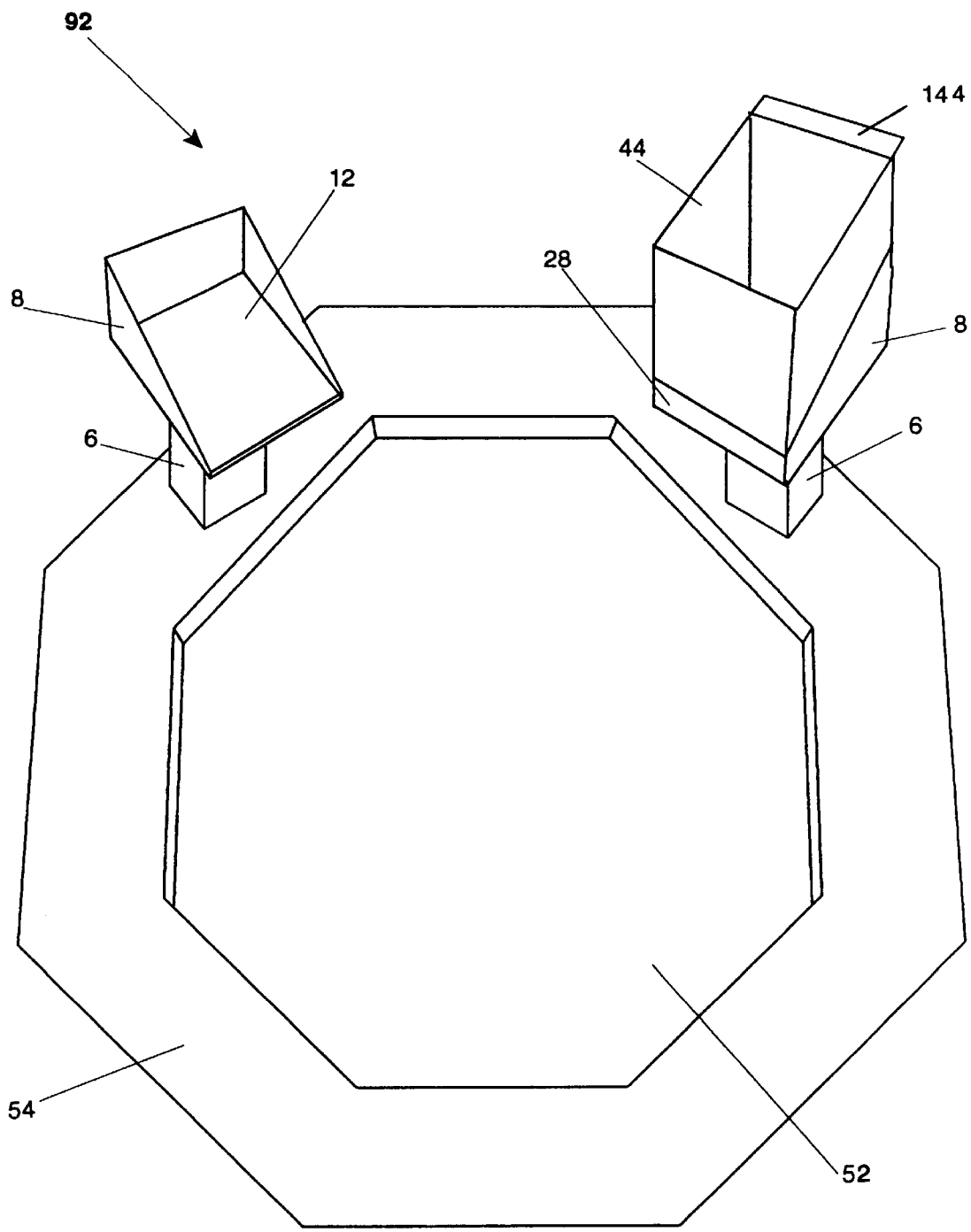
FIG. 8 is a front perspective view of a sixth preferred embodiment of the present invention having either modular components or a one-piece molded construction, with two elevated eating surfaces each attached to the top surface of an octagonal plate-like base member by a pillar-like support member in position remote from a user, and an insert/liner secured within one of the elevated eating surfaces to vertically extend its food-holding capacity.
Figure 18:
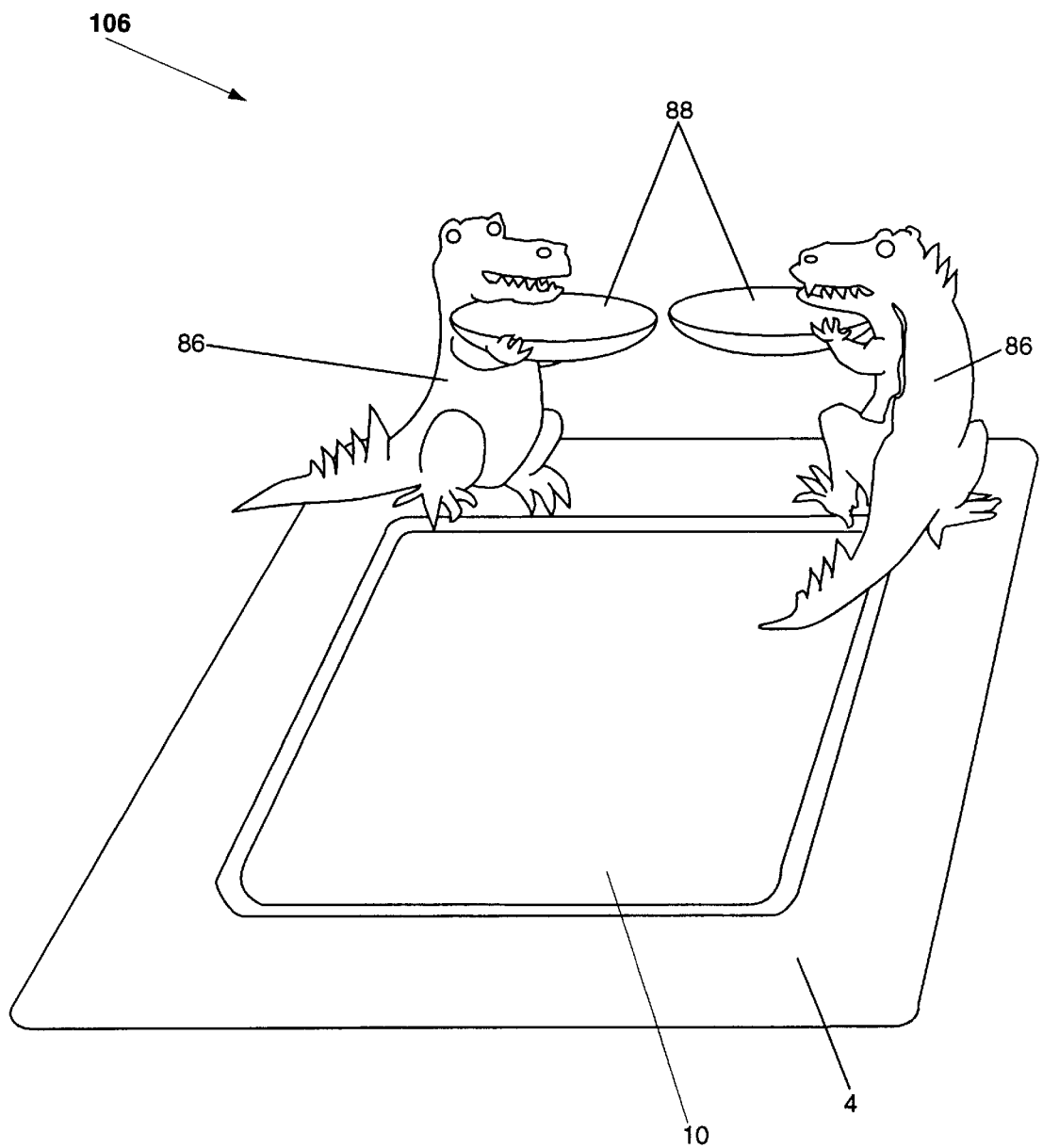
FIG. 18 is a perspective view of a thirteenth preferred embodiment of the present invention having either modular components or a one-piece molded construction, with two bowl-like elevated eating surfaces each attached to the top surface of a plate-like base member in a position remote from a user by a different pillar-like support member in the shape of a dinosaur.
Figure 19:
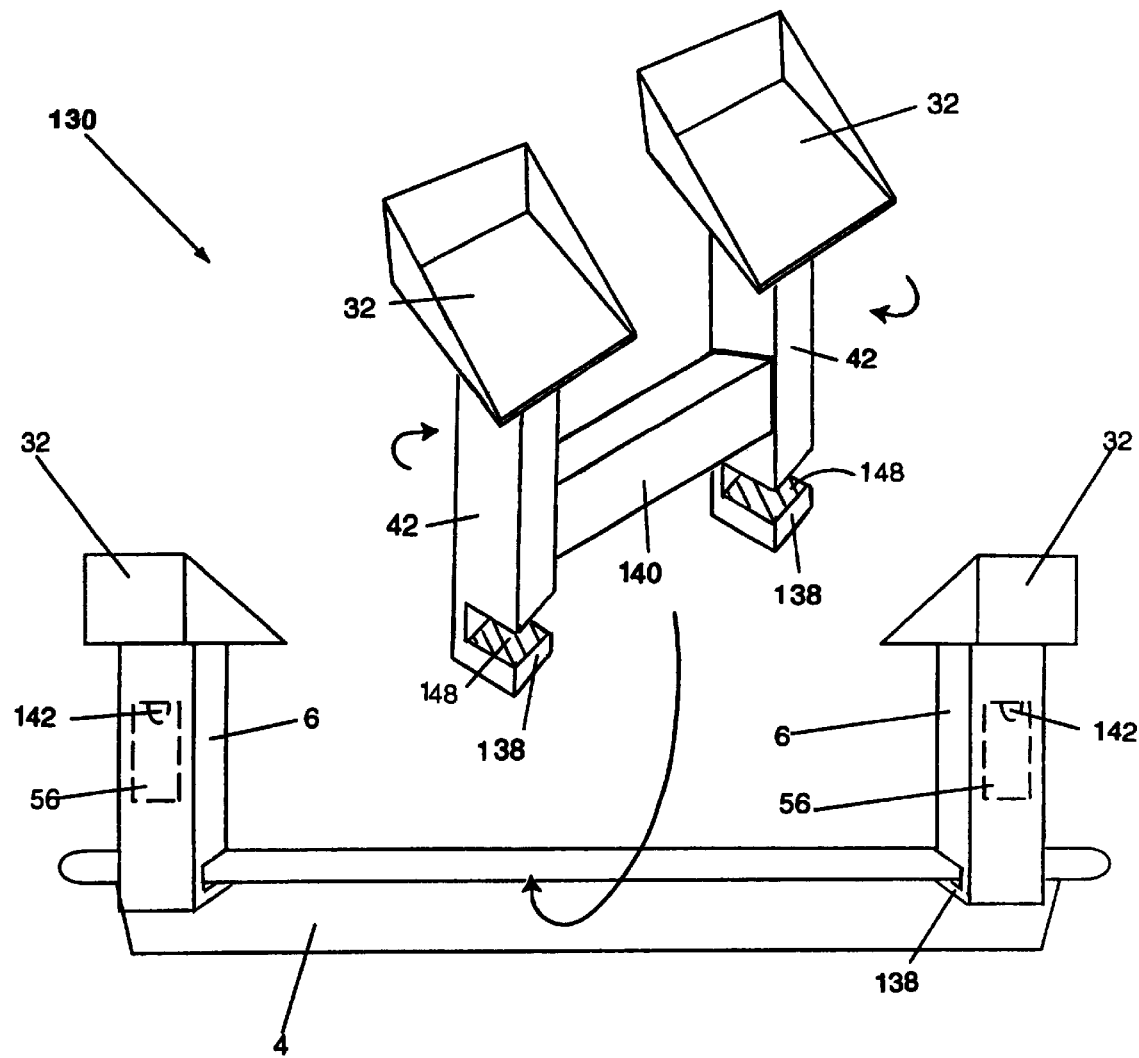
FIG. 19 is a perspective view of a fourteenth preferred embodiment of the present invention having either modular components or a one-piece molded construction, with four substantially planar tray-like elevated eating surfaces each supported by a pillar-like support member, all of the pillar-like support members having a lower clip for detachable connection to the rear perimeter edge of the base member, with two of the elevated eating surfaces laterally positioned on the rear perimeter edge, and the remaining two joined by a horizontal bar for stability and being poised for connection to the rear perimeter edge of the base member.
Figure 20:
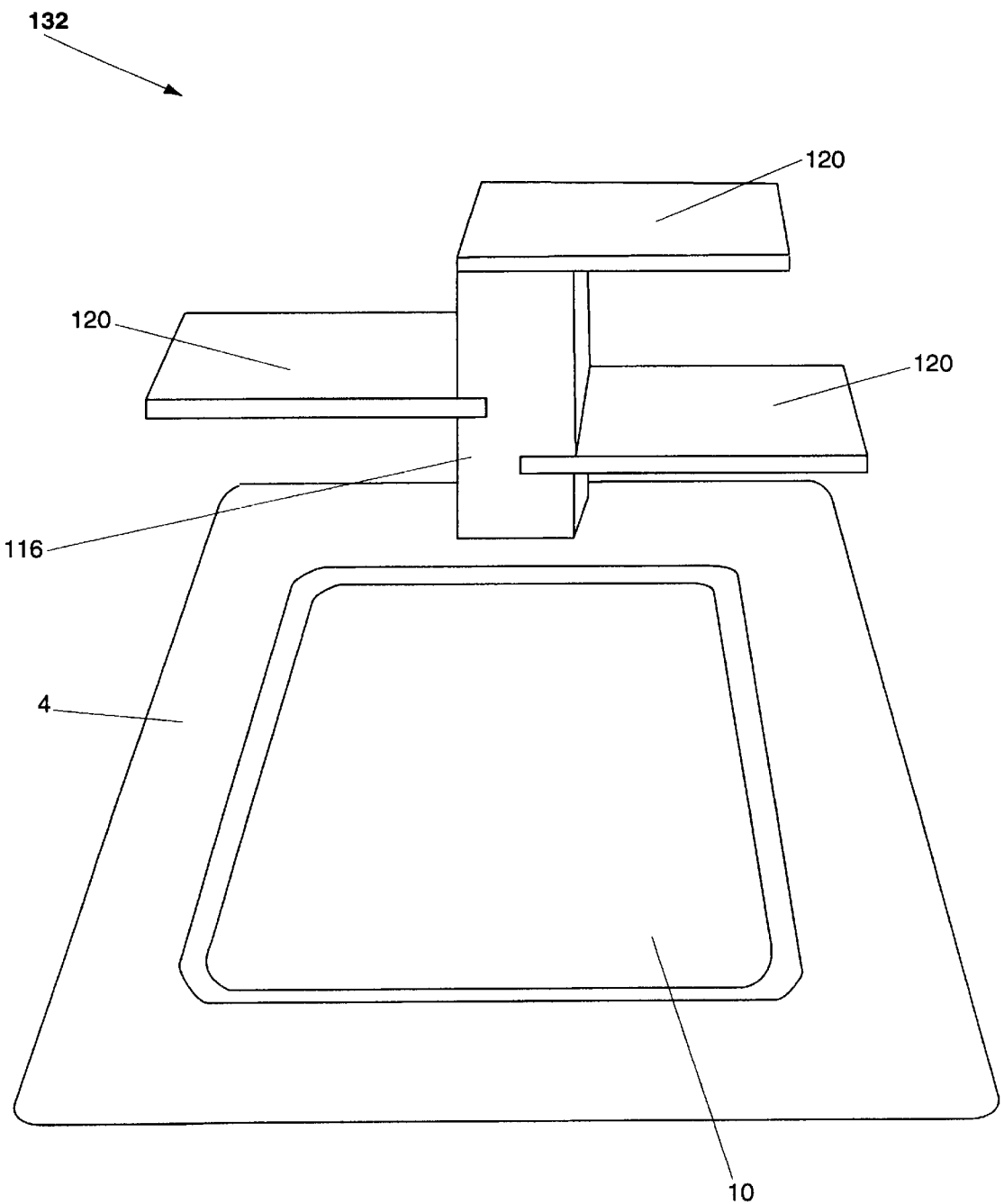
FIG. 20 is a perspective view of a fifteenth preferred embodiment of the present invention having either modular components or a one-piece molded construction, with three substantially planar platform-like elevated eating surfaces supported by a pillar-like support member, each having one of its ends attached to the pillar-like support member and horizontally extending from the pillar-like support member in an offset position from the other.
Figure 21:
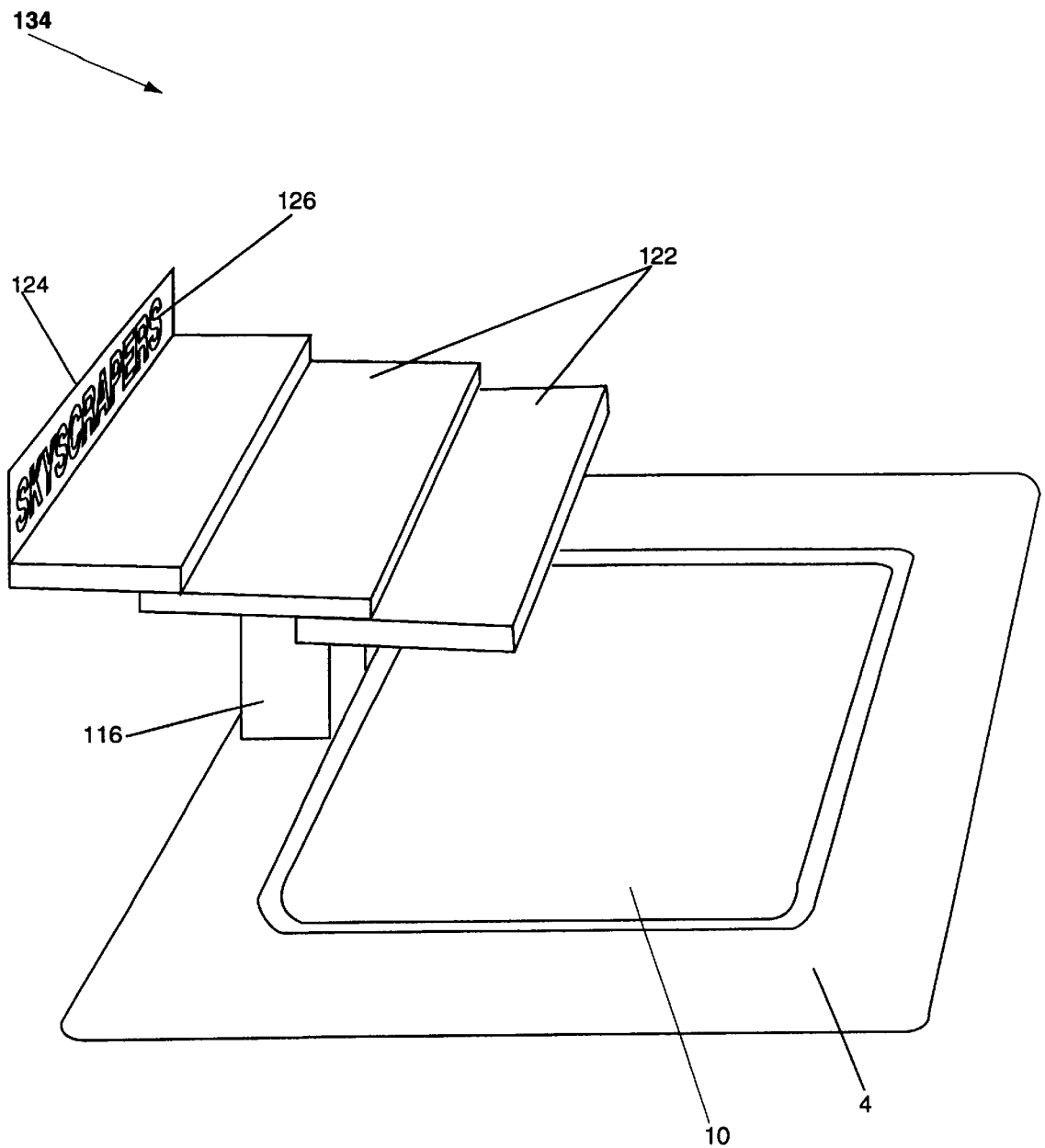
FIG. 21 is a perspective view of a sixteenth preferred embodiment of the present invention having either modular components or a one-piece molded construction, with multi-tiered elevated eating surfaces attached to the top surface of a plate-like base member by at least one pillar-like support member in a position remote from a user, the top multi-tiered elevated eating surface having an upwardly depending rear extension with word markings thereon.
Figure 22:
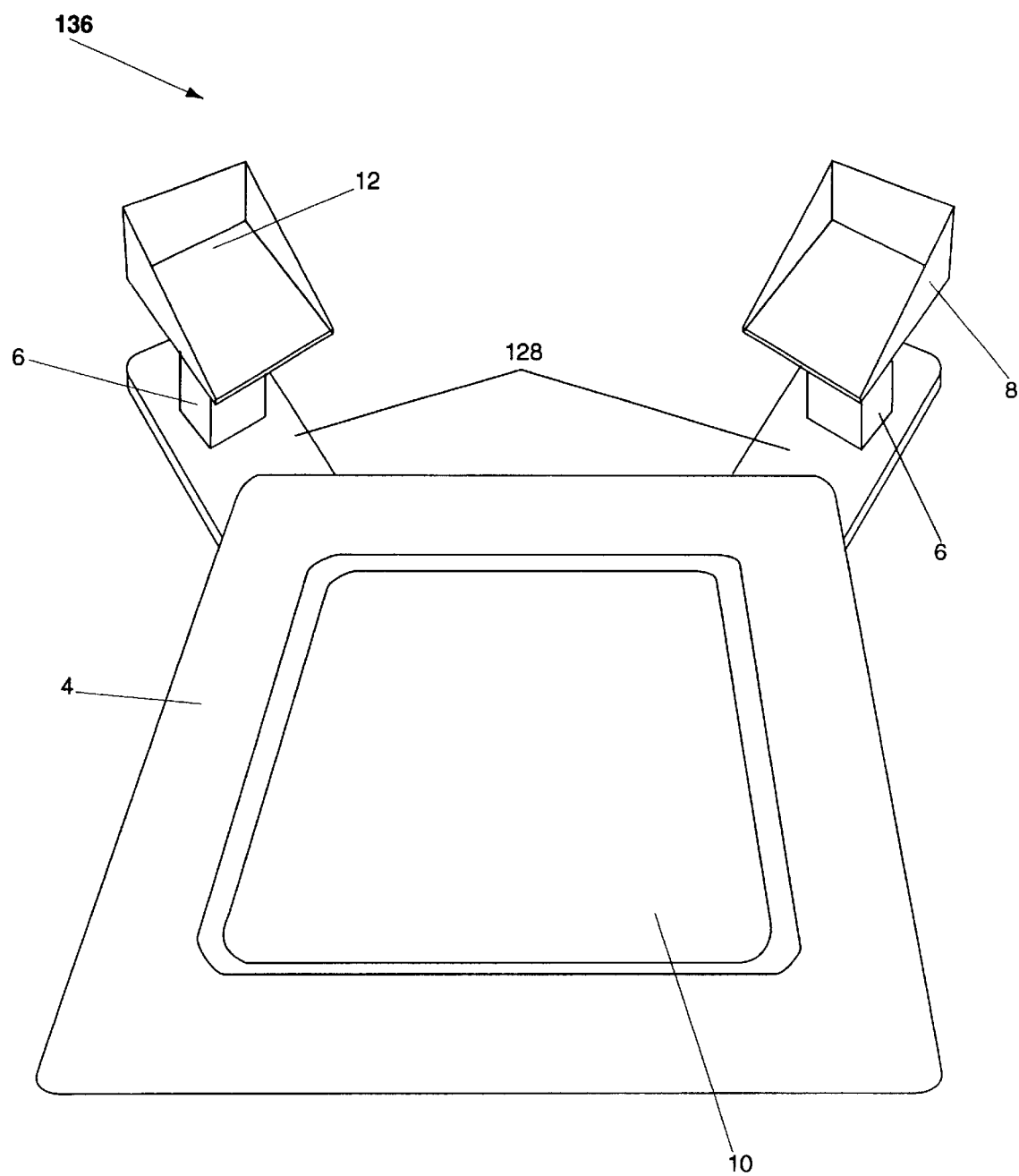
FIG. 22 is a perspective view of a seventeenth preferred embodiment of the present invention having either modular components or a one-piece molded construction, with a plate-like base member having two spaced-apart outwardly extending tabs in positions remote from a user, and two tray-like elevated eating surfaces each having side and back walls and each being attached to the top surface of one of the tabs through use of a pillar-like support member.

The preferred embodiments of the present invention disclose various food-holding devices with at least two eating surfaces at different height elevations that are intended for use by an individual for the convenient transport and/or eating of a variety of foods which may be incompatible in flavor or moisture content. One advantage offered by the preferred embodiments is the providing of an increased amount of eating surface area while maintaining a compact footprint, for use at events where table space is limited and does not allow the use of separate salad and dessert plates during a meal. Other advantages include the separation and transport of more food items during each trip to a buffet table without enlarging the perimeter of the base member people would have to carry, and use as a fun way to present food to children to encourage them to eat new foods as well as to work their way up to a reward or a dessert food item. Also, the present invention can be used as a learning tool for children when they are taught how to assemble the plate-like, tray-like and other food-supporting components or tray and when eating surfaces with numerical markings 58 are used by the children to earn points or select a hidden compartment to find a reward or surprise, as in the embodiments shown in FIGS. 9, 12, and 16. Although they can be made from many types of materials, the embodiments used for children and other embodiments requiring a lightweight construction would preferably be made from plastic. The preferred embodiments are configured to hold a portion of the supported food on separate eating surfaces or in compartments, including compartmentalized indentations 36 on a plate-like base member 4, as shown in FIGS. 4, 7, 11, and 12. Alternatively, the present invention can be made from separable modular units, as shown in FIGS. 4 and 12, or as molded units having a one-piece construction, as is preferred in FIG. 16. Although it is generally intended for both the modular and molded embodiments to be reusable, it is also considered within the scope of the present invention for any embodiment to be made from materials that allow it to be disposable and/or recycled after only a single use or a small number of uses. The modular and molded embodiments of the present invention have a base member that is plate-like (see FIGS. 1–13 and 15–22) or tray-like (see FIG. 14) and provides at least one lower eating surface, at least one eating surface that is elevated relative to the lower eating surface, and one or more support members upwardly depending from the base member or a second pillar-like or platform-like support member in an inferior position, with each support member holding one or more elevated eating surfaces. The elevated eating surfaces can have different configurations, being tray-like or plate-like as shown in FIGS. 1, 4, 7–9, 11, 12, 15, 17, 19, and 22, consisting of one or more compartments formed into the upper surface of a platform, as shown in FIGS. 2, 3, 5, 6, 13, 14, and 16, bowl-like as shown in FIG. 18, or platform-like, as shown in FIGS. 20 and 21. The support members used in each embodiment can optionally differ in height, as in FIGS. 4, 7, 9, and 11. Also, the support members used in each embodiment can be identical to one another, as in FIGS. 1, 15, and 18, or varied in configuration, as in FIG. 13, with some being narrow in construction and pillar-like, some being broadly constructed and platform-like, and others having 3-D relief and being in the form of animals or other three-dimensional objects relating to a decorative theme. Support members can also be configured to clip on to a plate-like base member, as shown in FIG. 19. Liquid-resistant or grease-resistant liner/inserts 44 can be optionally used with the elevated eating surfaces to vertically extend their food-holding capacity, as shown in FIGS. 5, 6, and 8. It is also contemplated for an independent beverage or food container, including but not limited to bowls or cups for soup, sauces, or dips, as well as containers for soft food items such as applesauce, cottage cheese, and pudding or mousse, and foods intended for eating with one's fingers such as fruit and cut vegetables, cubed cheese, shrimp, sauces, or elongated foods such as french fries, to be optionally supported in a secure upright orientation by the plate-like base member, a support member, or both, as shown in FIGS. 2, 3, 5, 6, 14, and 15. When elevated eating surfaces are used and positioned at different heights relative to one another, the present invention can be used to teach children to eat new foods by making them work their way up to a reward or a dessert located on the eating surface having the highest elevated position, as in FIGS. 12, 14, and 16. The multiple levels also make the present invention toy-like and therefore useful as a learning tool that captures the interest of children, particularly when surface decoration would be contoured and include 3-D relief in the form of a character familiar to the child. Batteries or other type of renewable power supply, as well as a speaker, microchip, and microphone, could be positioned within one of the pillars to further enhance the teaching value of the present invention by turning it into a talking character that presented safety-related or other important messages to children, as in FIG. 12. Also, permanent or detachable tabs can be provided to brace plate-like base members in an outrigger type of functions, and support pillars or platforms to allow more exposed eating surface area on the base member, as shown in FIG. 22 Further, although not shown, all surface areas of the preferred embodiments can be covered with decorative markings relating to many diverse topics, such as but not limited to a movie promotion, business logo, advertising campaign, or holiday theme.

Figure 1:
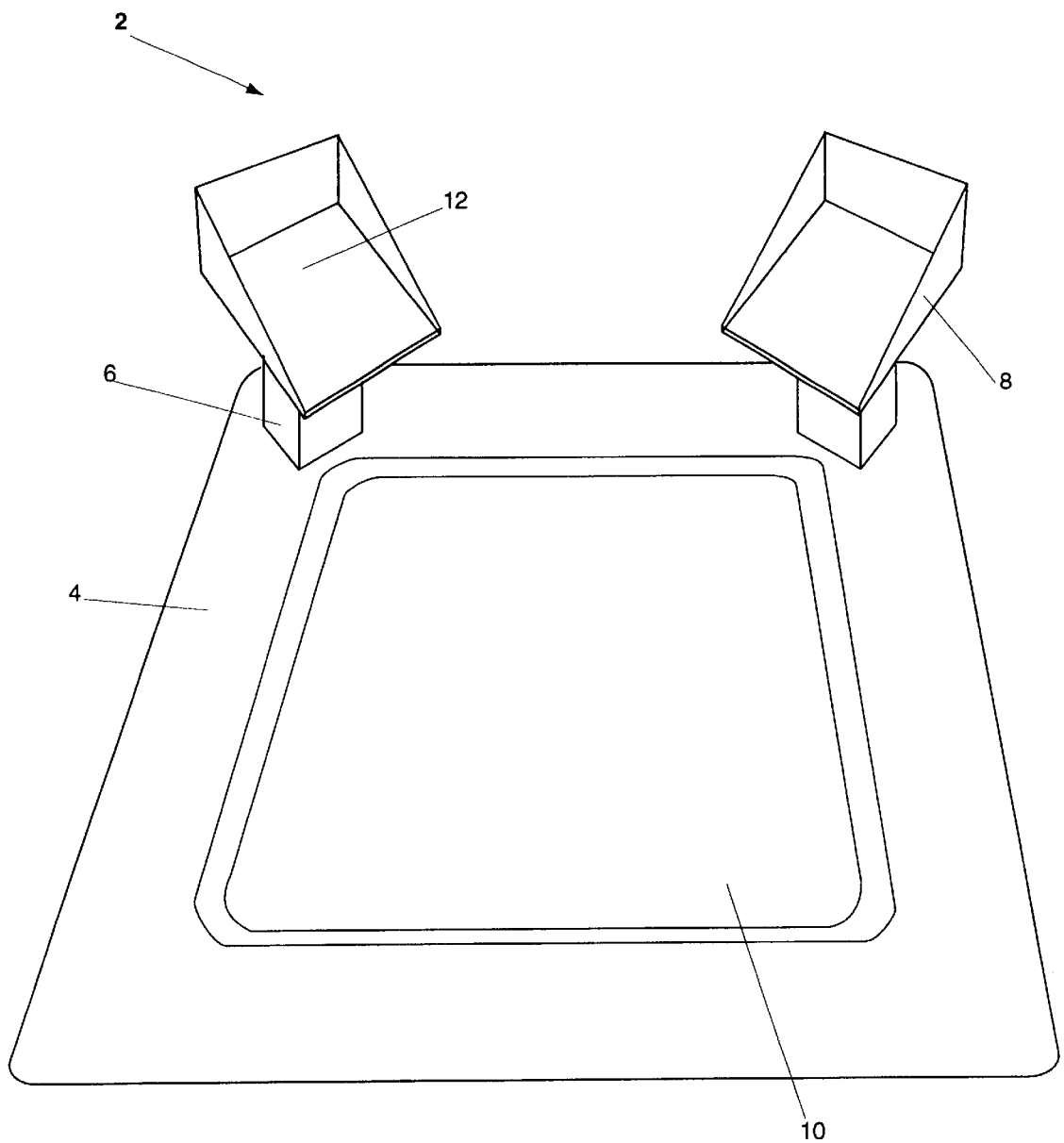
FIG. 1 is a front perspective view of a first preferred embodiment of the present invention having either modular components or a one-piece molded construction, with two tray-like elevated eating surfaces each having side and back walls and being attached to the top surface of a plate-like base member through the use of a narrow pillar-like support member in a position remote from a user.
Figure 9:
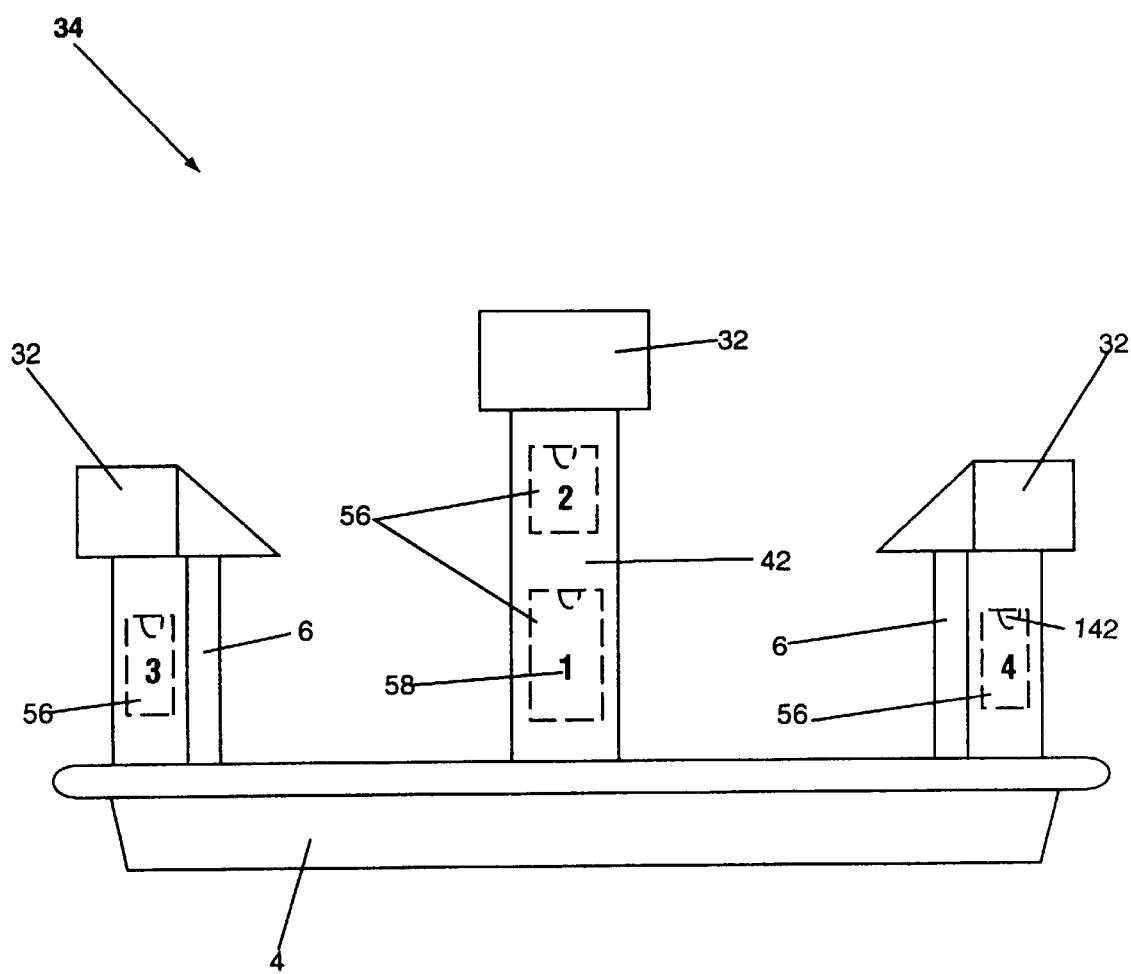
FIG. 9 is a rear view of the fourth preferred embodiment of the present invention having modular components, previously shown in FIG. 4, with three elevated eating surfaces each attached to the top surface of a plate-like base member by a pillar-like support member, the elevated eating surfaces being dimensioned for holding a beverage or soup container, food, or a small toy, and each pillar-like support member having at least one hidden compartment accessible through its rear surface.
Figure 14:
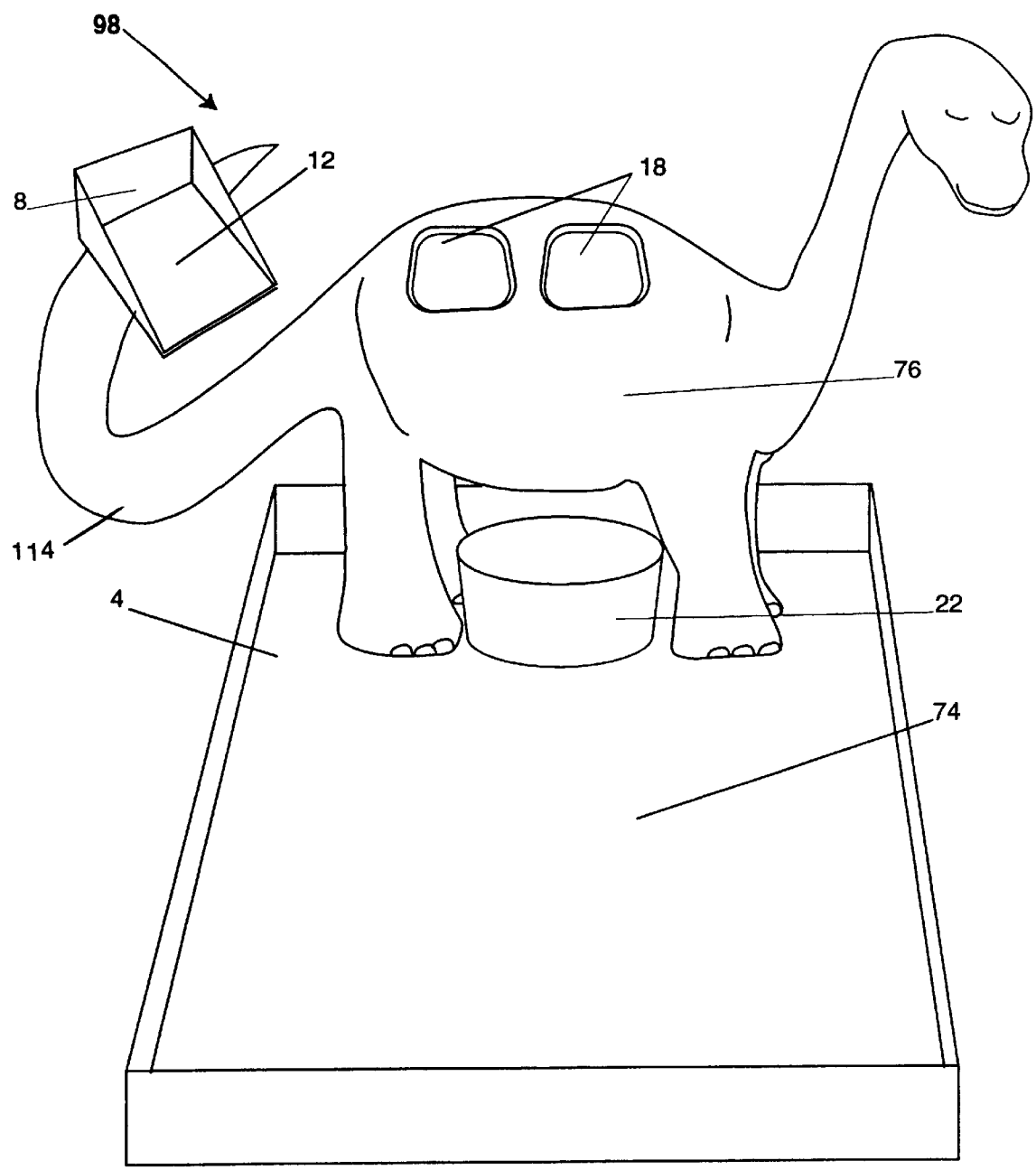
FIG. 14 is a front perspective view of a ninth preferred embodiment of the present invention having either a one-piece molded construction or a modular construction, a tray-like base member with one platform-like support member in the shape of a dinosaur being attached to the top surface of the tray-like base member in a position remote from a user, the dinosaur-shaped platform having two compartments extending downwardly through the dinosaur back in a position accessible to a user that are dimensioned for holding food, a beverage or soup container, or a small toy, the ninth embodiment also having an angled pillar-like support member extending from one of the sides of the dinosaur-shaped platform in the form of a partially raised dinosaur tail that is supporting one elevated eating surface, and a location for secure support of a beverage or soup container in an upright position being designated under the dinosaur between its feet.
Figure 15:
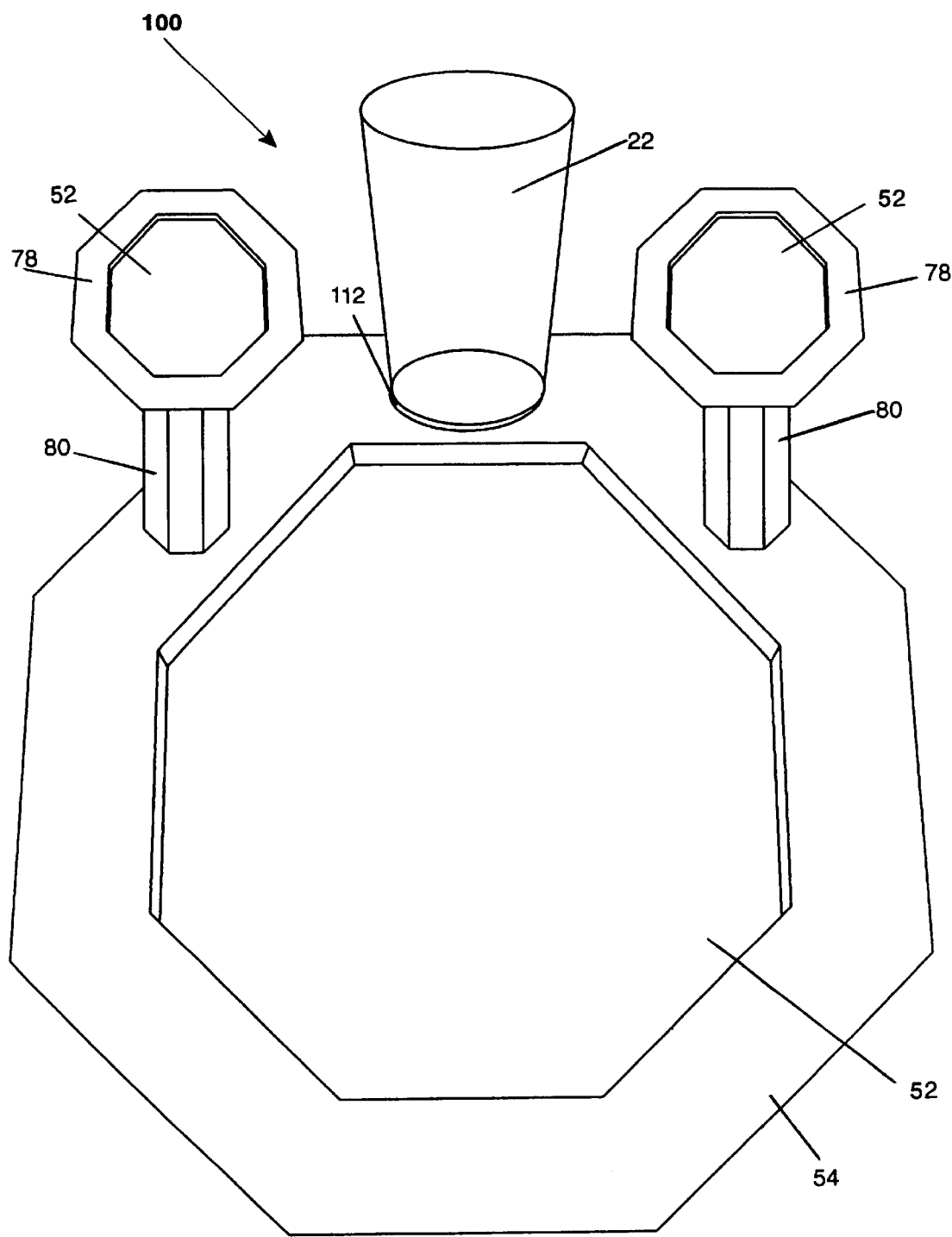
FIG. 15 is a front perspective view of a tenth preferred embodiment of the present invention having either modular components or a one-piece molded construction, with two non-rectangular plate-like elevated eating surfaces each with an octagonal perimeter configuration attached to the top surface of a non-rectangular plate-like base member by a non-rectangular pillar-like support member having a hexagonal perimeter configuration, the pillar-like support member being secured to the rear portion of the plate-like base member in a position remote from a user, the plate-like base member also having a non-rectangular configuration in the form of an octagon and a depression between the two pillar-like support members configured for secure positioning of a container for beverage or soup.

FIG. 1 shows a first preferred embodiment 2 of the present invention as a multiple-level eating surface apparatus for individuals, which has food-holding surfaces at two elevations. The first preferred embodiment 2 could either be made from assembled modular components or made as a one-piece unit through molded construction. FIG. 1 shows the first preferred embodiment 2 having a plate-like base member 4, two tray-like elevated eating surfaces 8 with side and back walls, and two pillar-like support members 6. Although not critical, the two tray-like elevated eating surfaces 8 appear to be identical in configuration and size to one another, as do the two pillar-like support members 6. Each tray-like elevated eating surface 8 is attached to the top surface of plate-like base member 4 with a different one of the pillar-like support members 6. Although not limited thereto, FIG. 1 shows base member 4 having a wide-rimmed rectangular configuration, each elevated eating surface 8 positioned in a rear corner of plate-like base member 4 remote from a user (not shown), and each elevated eating surface 8 facing toward the center of plate-like base member 4. Also, although FIG. 1 shows two elevated eating surfaces 8 and two pillar-like support members 6, it is considered within the scope of the present invention to have more than two elevated eating surfaces 8 and more than two pillar-like support members 6, such as is shown in FIGS. 4, 7, and 9, with additional elevated eating surfaces 8 positioned between the existing pillar-like support members 6 and other elevated eating surfaces 8 optionally being positioned laterally upon plate-like base member 4 between the user and the existing pillar-like support members 6. It is generally contemplated that less than half of the total surface area of base member 4 would be covered by elevated eating surfaces 8 and that the elevated eating surfaces 8 would be positioned so as not to interfere with user access to the exposed eating surface area on plate-like base member 4. FIG. 1 also shows base member 4 having a centrally positioned food-retaining indentation 10. Although FIG. 1 shows food-retaining indentation 10 having a substantially square configuration, it is equally contemplated for food-retaining indentation 10 to have a perimeter that is round, oval, hexagonal, triangular, octagonal, irregularly configured, or positioned off-center relative to plate-like base member 4. Also, although FIG. 1 shows pillar-like support members 6 each with a substantially square cross-sectional sectional configuration and tray-like elevated eating surfaces 8 each having a rectangular configuration, it is considered within the scope of the present invention to have pillar-like support members 6 and elevated eating surfaces 8 with other configurations, such as is shown in FIG. 15. Further, FIG. 1 shows pillar-like support members 6 approximately perpendicular to base member 4. However, it is also contemplated for pillar-like support members 6 to also be positioned in various non-perpendicular orientations relative to base member 4, such as the dinosaur tail 114 shown in FIG. 14. Although it is not critical that tray-like elevated eating surfaces 8 be in a completely horizontal orientation, each must be close to a horizontal orientation so that food items (not shown) will remain positioned thereon until eaten.

FIG. 1 also shows each tray-like elevated eating surface 8 having a top surface 12, with upwardly depending side and back walls that help to resist movement of food (not shown) from top surface 12 during retrieval of food for consumption. Although not limited thereto, when it is intended that first preferred embodiment 2 be reusable, the components of first preferred embodiment 2 could be made from non-toxic materials such as plastics, glass, lead-free ceramics, wood, and metal, or a combination thereof, the thickness of the materials being determined by the need for rigid food support without collapse. Also, when food transport is also contemplated, such as during buffet use, plastics or other lightweight materials would be used to provide a conveniently portable food-holding apparatus. When first preferred embodiment 2 is made from separable modular parts, each could have a different color and be transparent, translucent, or opaque. Also, although not shown, every exposed surface of first preferred embodiment 2 can be a canvas for decorative markings, or other surface decoration to include but not be limited to 3-D relief, word markings such as number 126 in FIG. 21, decals, or any combination thereof. Further, when first preferred embodiment 2 is made as a one-piece unit from molded construction, it could be formed into many decorative shapes, such as that of a medieval castle, spaceship, soccer stadium, or animal.

In addition, although both pillar-like support members 6 in FIG. 1 have a similar height dimension, it is also contemplated for pillar-like support members 6 of first preferred embodiment 2 to also have differing height dimensions, as shown in FIG. 12, so that a child (not shown) could be taught to eat new foods by requiring them to eat new foods placed at lower levels and then having them work their way up to the reward of a dessert or a toy placed at the highest level. The multiple levels also make the present invention visually toy-like and therefore useful as a learning tool that captures the interest of children particularly when surface decoration would provide the face of a person or character familiar to the child. A unit with batteries, a microchip, and optionally a microphone 68, a speaker 66, and an activation switch 118, as shown in FIG. 12, could be placed within one of the pillar-like support members 6 to further enhance the teaching value of the present invention by helping to turn it into a talking character that would present safety related or other important messages to children. Modular construction and the separation of elevated eating surfaces 8, pillar-like support members 6, and base members 4 from one another would allow for easy cleaning and storage of first preferred embodiment 2. The interchangeable nature of elevated eating surfaces 8, pillar-like support members 6, and base members 4 would also allow first preferred embodiment 2 to be used as a construction-type toy for children as long as no sharp edges were present, as well as assembly of first preferred embodiment 2 into custom color coordinated individual dining surfaces that complement or enhance party decor.

Figure 2:
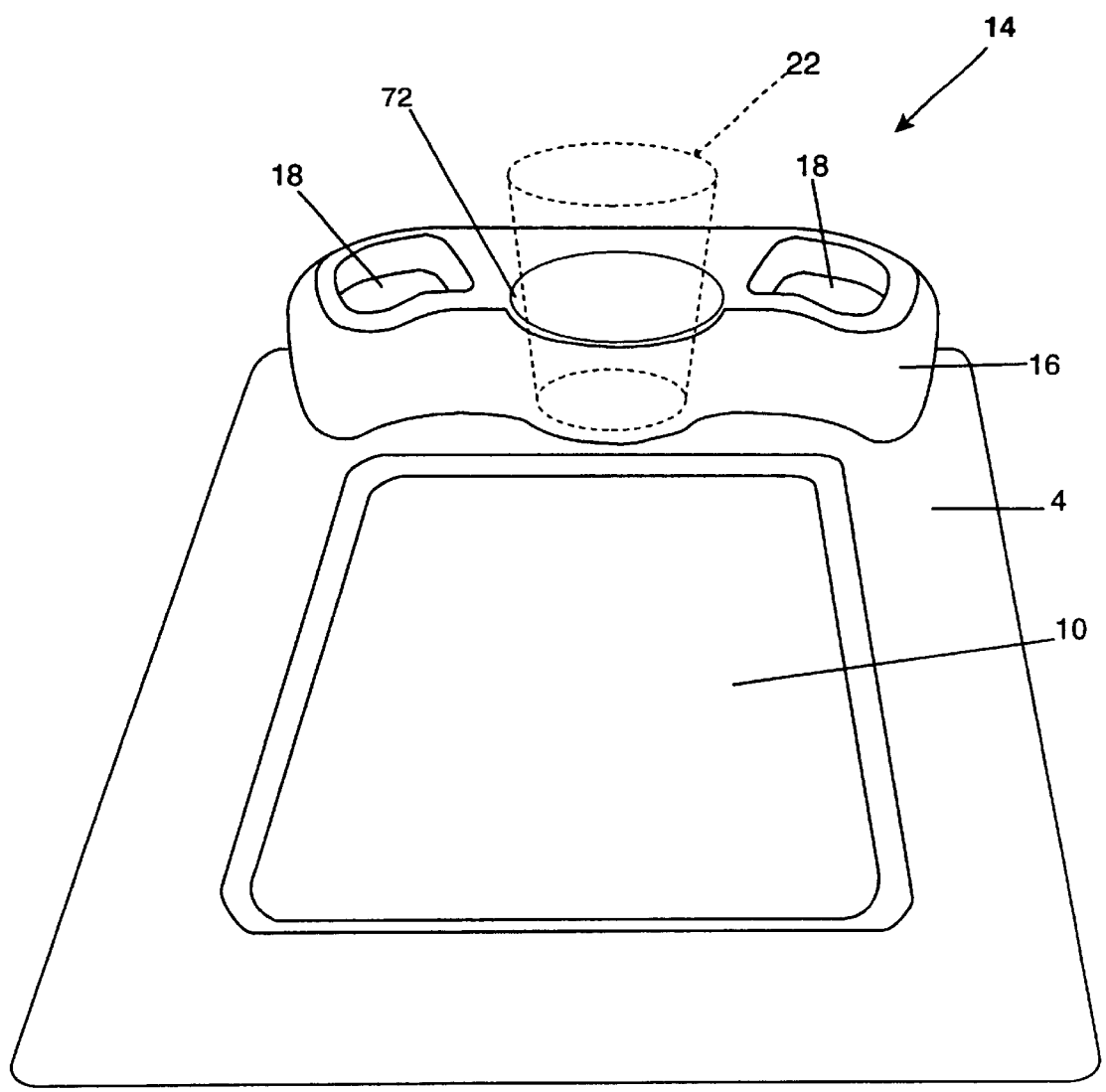
FIG. 2 is a front perspective view of a second preferred embodiment of the present invention having either modular components or a one-piece molded construction, with one broad platform-like support member having an arcuate perimeter configuration and being attached to the top surface of a plate-like base member in a position remote from a user, the platform-like support member having three compartments extending downwardly through its upper surface which are dimensioned for holding a beverage or soup container, food, or a small toy.

FIG. 2 shows a second preferred embodiment 14 of the present invention as a multiple-level eating surface apparatus for individuals, which has food-holding surfaces at two elevations. The second preferred embodiment 14 could either be made from assembled modular components or made as a one-piece unit through molded construction. FIG. 2 shows second preferred embodiment 14 having a plate-like base member 4 and one platform-like support member 16 with two laterally positioned small capacity compartments 18 downwardly positioned through its upper surface and a large capacity compartment 72 holding a cup 22 for beverages, soup, shrimp cocktail, sauces, dips, mousse, puddings, or gelatin, in a manner similar to the use of insert/liner in FIGS. 4 and 5 to vertically extend the food-holding capacity of large capacity compartment 72. Further, large capacity compartment 72 can be used directly to hold soft food items, as well as food items intended to be eaten with one's fingers, such as french fries, carrot and celery sticks, bread, and shrimp. Although not critical, the two small capacity compartments 18 appear to be identical in configuration and size to one another, as well as in placement relative platform-like support member 16. FIG. 2 further shows platform-like support member 16 having an arcuate perimeter edge and being attached to the top surface of base member 4 in a position remote from a user (not shown). Although FIG. 2 only shows platform-like support member 16 positioned along the back perimeter of plate-like base member 4, it is also contemplated for platform-like support member 16 to curve around and extend partially along the sides of plate-like base member 4. FIG. 2 also shows base member 4 with a rectangular configuration and a centrally located rectangular indentation 10 having a depth dimension convenient for retaining food on base member 4 during transport. The rectangular configurations of plate-like base member 4 and indentation 10 are not critical, and other shapes including those with curvilinear perimeters are equally contemplated. The wide-rimmed front and side edges of plate-like base member 4 are also not critical. It is contemplated for the small capacity compartments 18 shown in FIG. 2 to be dimensioned for holding either soft food items (not shown), food items intended to be eaten with one's fingers, or a small toy, such as small toy 64 shown in FIG. 4. Although FIG. 2 shows small capacity compartments 18 laterally positioned downwardly through the upper surface of platform-like support member 16 and larger capacity compartment 72 extending downwardly through the upper surface of platform-like support member 16 between small capacity compartments 18, it is equally contemplated for the two small capacity compartments 18 to be positioned adjacent to one another with the large capacity compartment 72 near to one of the ends of platform-like support member 16.

Figure 3:
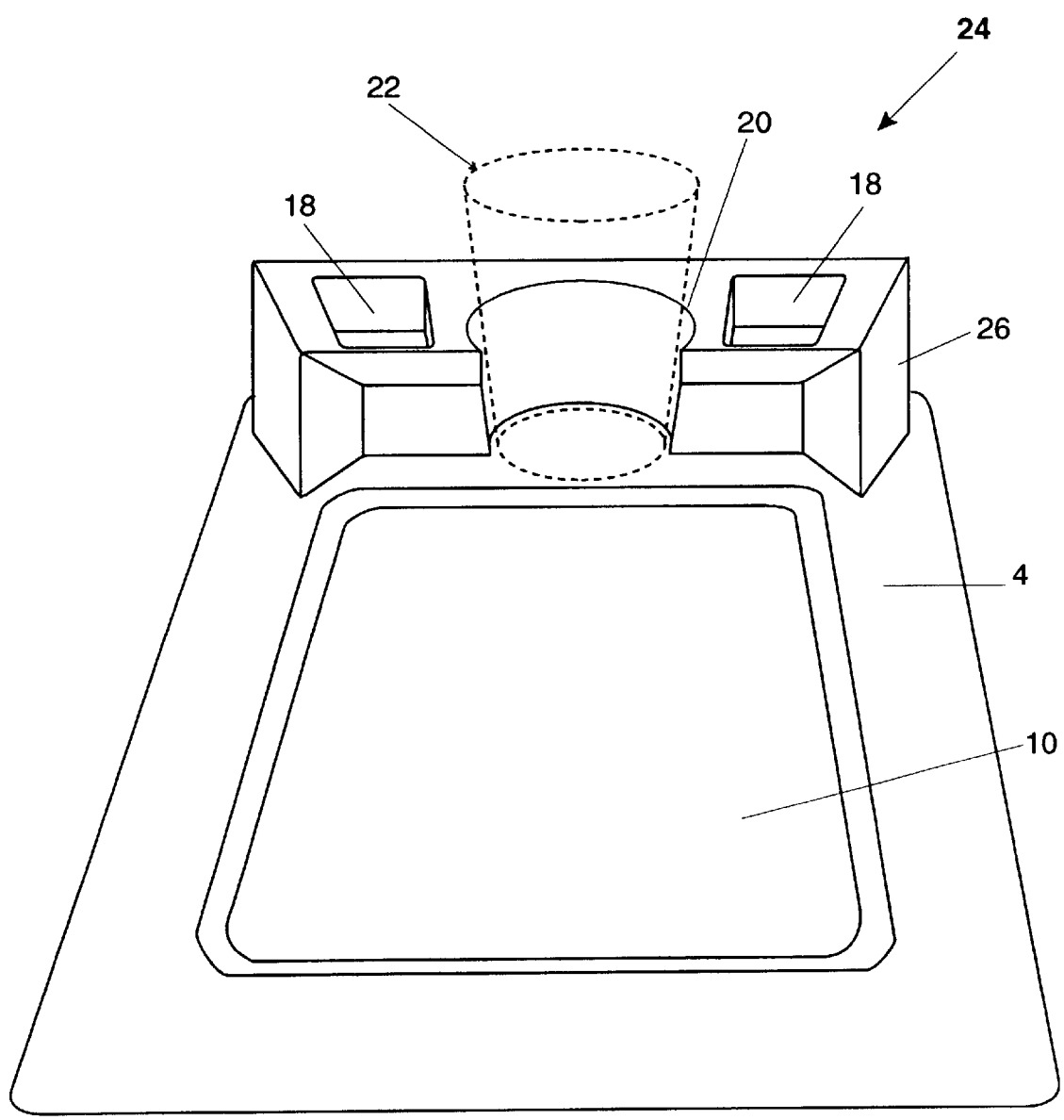
FIG. 3 is a front perspective view of a third preferred embodiment of the present invention having either modular components or a one-piece molded construction, with one broad platform-like support member having an angular perimeter configuration and being attached to the top surface of a plate-like base member in a position remote from a user, the platform-like support member having two compartments extending downwardly through its upper surface which are dimensioned for holding food or a small toy, and one front recessed compartment for holding a container for beverage or soup securely in an upright position.

FIG. 3 shows a third preferred embodiment 24 of the present invention as a multiple-level eating surface apparatus for individuals, which has food-holding surfaces at two elevations. The third preferred embodiment 24 could either be made from assembled modular components or made as a one-piece unit through molded construction. FIG. 3 shows the third preferred embodiment 24 having a plate-like base member 4 and one substantially platform-like support member 26 with two laterally positioned small capacity compartments 18 downwardly positioned through its upper surface and a recessed compartment 20 holding a cup 22 for beverages, soup, shrimp cocktail, sauces, mousse, puddings, gelatin, or dips in a manner similar to the use of insert/liner in FIGS. 5 and 6 to vertically extend the food-holding capacity of one small capacity compartment 18. Although not critical, the two small capacity compartments 18 appear to be identical in configuration and size to one another, as well as in placement relative platform-like support member 26. FIG. 3 further shows rectangular platform-like support member 26 having an angular perimeter configuration and being attached to the top surface of base member 4 in a position remote from a user (not shown). Although FIG. 3 only shows platform-like support member 26 positioned along the back perimeter of plate-like base member 4, it is also contemplated for platform-like support member 26 to be angled so as to extend partially along the wide-rimmed side edges of plate-like base member 4. Also, although FIG. 3 shows small capacity compartments 18 laterally positioned downwardly through the upper surface of platform-like support member 26 and recessed compartment 20 between small capacity compartments 18, it is equally contemplated for the two small capacity compartments 18 to be positioned adjacent to one another with the recessed compartment 20 near to one of the ends of platform-like support member 26. FIG. 3 also shows base member 4 with a substantially rectangular configuration and a centrally located rectangular indentation 10. The rectangular configurations of base member 4 and indentation 10 are not critical and other perimeter configurations are also considered to be within the scope of the present invention. In FIG. 3, recessed compartment 20 opens through the front side of platform-like support member 26 so that a cup 22 positioned therein extends through the front surface of platform-like support member 26 allowing cup 22 to be easily inserted into and removed from recessed compartment 20. Therefore, the recessed compartment 20 in the third preferred embodiment 24 could not be used directly for the containment of soft food items (not shown), as is possible in FIG. 2 with large capacity compartment 72 wherein the bottom of a cup 22 positioned therein would be totally contained within the perimeter edges of platform-like support member 16. Although not shown, many other similar variations of the modular and molded third preferred embodiments 24 are possible, such as but not limited to round or oval base members 4, a platform-like support member 26 with one small capacity compartment 18 and two recessed compartments 20, a platform-like support member 26 with only three small capacity compartments 18 and no recessed compartment 20, and a platform-like support member 26 with no small capacity compartments 18 and only two recessed compartments 20.

FIG. 4 shows a fourth preferred embodiment 34 of the present invention as a multiple-level eating surface apparatus for individuals, which has food-holding surfaces at three different elevations. The fourth preferred embodiment 34 could either be made from assembled modular components or made as a one-piece unit through molded construction. FIG. 4 shows the fourth preferred embodiment 34 having a wide-rimmed plate-like base member 4, three modular elevated eating surfaces 32 with snap-together connections 30 as well as side and back walls, two pillar-like support members 6, and one taller pillar-like support member 42. Although not critical, the three modular elevated eating surfaces 8 appear to be tray-like, as well as identical in configuration and size. The height dimension of the two smaller pillar-like support members 6 is also not critical. Each laterally positioned modular elevated eating surface 32 is attached to the top surface of plate-like base member 4 with a different one of the pillar-like support members 6, with tall pillar-like support member 42 positioned under the center modular elevated eating surface 32. FIG. 4 further shows the three modular elevated eating surfaces 32 each with indentations in its bottom surface as part of a quick-releasing snap-together connection 30 and a slightly raised front edge 28 which allows food (not shown) to remain on top surfaces 12 when a utensil is inserted into the food and moves it around in order to secure a quantity of the food for consumption. Although not shown, front edge 28 could be arcuate or attached at an oblique angle relative to top surface 12. FIG. 4 also shows pillar-like support members 6 and tall pillar-like support member 42 each having several bottom indented and upper protruding snap-together connections 30. FIG. 4 further shows plate-like base member 4 having a centrally located compartmentalized indentation 36 with several quick-release snap-in type of connectors 38 laterally on the wide rim of plate-like base member 4, which allow rapid connection and removal of small objects therefrom, such as utensils 40, a napkin (not shown), or a small elongated toy 64. FIG. 4 also shows the rear portion of base member 4 having three spaced-apart arrays of protruding snap-together connections 30 for use in connecting pillar-like support members 6 and tall pillar-like support member 42 to base member 4. Although FIG. 4 shows quick-releasing snap-together connections 30 each having four centrally located protrusions and four complementary indentations, the configuration of snap-together connection 30 is not critical and it is considered within the scope of the present invention for snap-together connection to have any number of protrusions and indentations in any pattern that securely locks modular components, such as pillar-like support members 6, tall pillar-like support members 42, and is modular elevated eating surfaces 32 in place during use yet allows them to be easily releasable upon demand. It is contemplated for each modular tray-like elevated eating surface 32 to be dimensioned for holding a beverage, food, or a small toy (not shown).

FIGS. 5 and 6 show the fourth preferred embodiment 34 of the present invention, previously shown in FIG. 3, as a multiple-level eating surface apparatus for individuals, which has food-holding surfaces at two elevations. The fourth preferred embodiment 34 could either be made from assembled modular components or made as a one-piece unit through molded construction. FIGS. 5 and 6 show the fourth preferred embodiment 34 having a plate-like base member 4 and one substantially rectangular platform-like support member 26 with two laterally positioned small capacity compartments 18 downwardly positioned through its upper surface dimensioned for holding a beverage, food, or a small toy, and a recessed compartment 72 positioned between the two small capacity compartments 18 and configured for insertion of a cup 22 for a beverage or food items such as soup, shrimp cocktail, sauces, soft dessert items, dips, french fries or cut vegetables. The two small capacity compartments 18 appear to be identical in configuration and size to one another, as well as in placement relative platform-like support member 16. FIGS. 5 and 6 show plate-like base member 4 having one large central food-holding indentation 10 and platform-like support member 26 being attached to the top surface of plate-like base member 4 in a position remote from a user (not shown). Although recessed compartment 20 is shown in FIGS. 5 and 6 positioned between the two small capacity compartments 18, it could equally be positioned on one of the ends of platform-like support member 26. Also, in both FIGS. 5 and 6 a cup 22 is secured within recessed compartment 20. In addition, both FIGS. 5 and 6 show an insert/liner 44 for use in vertically extending the food-holding capacity of one of the small capacity compartments 18, and configured for holding foods such as soup, sauces, dips, cut fruit and vegetables, cubed cheese, bread sticks, and french fries (not shown). In FIG. 5, insert/liner 44 is poised for insertion into one of the small capacity compartments 18, while in FIG. 6 insert/liner 44 is in its position of use within platform-like support member 26. Although not shown, two insert/liners 44 could be used so that both of the small capacity compartments 18 have a vertically extended food-holding capacity.

FIG. 7 shows a fifth preferred embodiment 90 of the present invention as a multiple-level eating surface apparatus for individuals, which has food-holding surfaces at three different elevations. The fifth preferred embodiment 90 could either be made from assembled modular components or made as a one-piece unit through molded construction. FIG. 7 shows the fifth preferred embodiment 90 having a plate-like base member 4, two lateral plate-like upper eating surfaces 48 without side and back walls, two smaller tapered pillar-like support members 46, one central larger plate-like upper eating surface 110, and one taller tapered pillar-like support member 50. Although not critical, the two laterally positioned plate-like elevated eating surfaces 48 appear to be identical in configuration and size to one another, as do the two laterally positioned pillar-like support members 46. Also, the two laterally positioned plate-like upper eating surfaces 48 are attached to the top surface of plate-like base member 4 with a different one of the tapered pillar-like support members 46. The larger plate-like elevated eating surface 110 is centrally positioned on taller tapered pillar-like support member 50. FIG. 7 shows the two smaller tapered pillar-like support members 46 and the taller tapered pillar-like support member 50 all having a wide bottom perimeter so that each may be stacked with like components for compact storage. Although FIG. 7 shows tapered pillar-like support members 48 and 50 each attached to the top surface of base member 4 in an aligned position remote from a user, such positioning is not critical and a variation of fifth embodiment 90 could include four plate-like elevated eating surfaces 48, with two plate-like elevated eating surfaces 48 attached as shown in the rear corners of plate-like base member 4 and the two additional plate-like elevated eating surfaces 48 positioned along the sides of plate-like base member 4 between the user and the existing corner positioned plate-like elevated eating surfaces 48. Also, in place of larger plate-like elevated eating surface 110 positioned on taller tapered pillar-like support member 50, cup 22 or a toy, such as toy 84 in FIG. 17, could be positioned along the rear perimeter of plate-like base member 4 between the two corner positioned plate-like elevated eating surfaces 48. Further variations could include all four plate-like elevated eating surfaces 48 being positioned at the same elevation relative to plate-like base member 4, or in the alternative each could be at a progressively higher or lower elevation relative to the others. The two plate-like elevated eating surfaces 48 and larger plate-like elevated eating surface 110 are each substantially planar in configuration and each has a central indentation 10 for helping to retain food or a small toy, such as toy 64 in FIG. 7 or toy 84 in FIG. 17. FIG. 7 shows plate-like base member 4 having two small and one large compartmentalized indentations 36, as well as several quick-release snap-in connectors 38 which allow rapid connection and removal of small objects, such as utensils 40, a napkin (not shown), or an elongated toy 64, from the lateral portions of base member 4. If additional plate-like elevated eating surfaces 48 are used along the sides of plate-like base member 4, snap-in connectors 38 could be moved to a more forwardly position on plate-like base member 4 than is shown in FIG. 7. The number, size, and arrangement of compartmentalized indentations 36 relative to one another is not critical, nor is the use of plate-like elevated eating surfaces 48 and larger plate-like elevated eating surface 110 having a central indentation 10. Those having other configurations are also considered to be within the scope of the fifth preferred embodiment of the present invention. In the alternative, other variations of the fifth embodiment 90 could include but not be limited to a tray-like base member 74 such as is shown in FIG. 14, three smaller stackable pillar-like support members 46, two tall stackable pillar-like support members 50 with one smaller stackable pillar-like support member 46 positioned between them, and upper eating surfaces with sizes and configurations different from plate-like elevated eating surfaces 48 and larger plate-like elevated eating surface 110. Also, the alignment of stackable pillar-like support members 46 and 50 relative to the back perimeter edge of plate-like base member 4 is not critical, and any of the stackable pillar-like support members 46 and 50 may be aligned with the perimeter edge or offset in an angled position relative thereto.

FIG. 8 shows a sixth preferred embodiment 92 of the present invention as a multiple-level eating surface apparatus for individuals, which has food-holding surfaces at two elevations. The sixth preferred embodiment 92 could either be made from assembled modular components or made as a one-piece unit through molded construction. FIG. 8 shows the sixth preferred embodiment 92 having an octagon-shaped plate-like base member 54, two tray-like elevated eating surfaces 8 with side and back walls, and two pillar-like support members 6. Although not critical, the two tray-like elevated eating surfaces 8 appear to be identical in size to one another, as do the two pillar-like support members 6. FIG. 8 further shows the two tray-like elevated eating surfaces 8 each attached to the top surface of a plate-like base member 54 by a different one of the pillar-like support members 6 in a position remote from a user. Although FIG. 8 shows plate-like base member 54 having an octagonal configuration and an octagonal food-retaining indentation 52, non-rectangular plate-like base member 4 could comprise other configurations, such as oval, hexagonal, round, trapezoid-shaped, triangular, and the like, or have an irregular curvilinear perimeter. FIG. 8 further shows one tray-like elevated eating surface 8 being three-walled and having its top surface 12 exposed for receipt of food (not shown) or a toy, such as the airplane-shaped toy 64 shown in FIG. 7 or the dinosaur-shaped toy 84 shown in FIG. 17. The second tray-like elevated eating surface 8 shown in FIG. 8 has a slightly raised front edge 28 to make it a four-walled food-receiving receptacle. The addition of slightly raised front edge 28 also helps to secure an insert/liner 44 in position upon the targeted top surface 12 to vertically extend the food holding capacity of the tray-like elevated eating surface 8 with which it is used. Insert/liner 44 may be made from plastic or paper products, and can be liquid-resistant for holding a beverage that can be consumed using a bendable straw or for buffet items such as soup, shrimp, sauces, dips, or cut pieces of fruits or vegetables, or in the alternative the liner/insert 44 can be grease-resistant for holding food items such as french-fries, cheese coated bread sticks, fried cheese sticks, and buffalo wings. It is contemplated for insert/liner 44 to remain within tray-like elevated eating surface 8 during consumption of the food items (not shown) it contains, or be removed and placed in a position closer to the user for easier access to the contents of insert/liner 44. For ease in lifting insert/liner 44 from tray-like elevated eating surface 8 without touching the food items therein, FIG. 8 shows insert/liner 44 having a rearwardly depending flange 144.

FIG. 9 shows the fourth preferred embodiment 34, previously shown in FIG. 4, also having hidden compartments 56 and numerical markings 58 on the rear surfaces of the smaller laterally positioned pillar-like support members 6 as well as on the rear surface of tall pillar-like support member 42 centered therebetween. FIG. 9 shows fourth preferred embodiment 34 having modular components or molded components, with three tray-like modular elevated eating surfaces 32 each positioned above plate-like base member 4 through use of a different one of the smaller three pillar-like support members 6, or the tall pillar-like support member 42. Each smaller pillar-like support member 6 has one downwardly opening hidden compartment 56 through its rear surface. FIG. 9 also shows tall pillar-like support member 42 having two downwardly opening hidden compartments 56, one positioned above the other. Although a downwardly opening hidden compartment 56 is conveniently accessed, it is not critical, and although not shown it is also contemplated for any of the hidden compartments 56 in the fourth preferred embodiment, or any other preferred embodiment of the present invention to open in an upwardly direction or laterally, or to have an upwardly or downwardly sliding panel. Each hidden compartment 56 also has consecutive numerical markings 58 thereon, and a cutout/notch 142 for use as a finger-hold in separating it from its respective support member, either a pillar-like support member 6, or tall pillar-like support member 42. The size and configuration of cutout/notch 142 are not critical, as long as it allows for easy opening of hidden compartment 56, and it can have an arcuate, angular, or curvilinear perimeter. One or more prizes (not shown) could be stored within any of the hidden compartments 56 in any of the preferred embodiments of the present invention. As a child would eat an amount of food in one of the modular elevated eating surfaces 32 sufficient to expose a number on its top surface 12, the child could be rewarded by being able to turn the present invention around to access its back surface and subsequently open one or more of the hidden compartments 56 to obtain a gift or surprise, the hidden compartments 56 being selected according to some predetermined relationship with the numerical marking 58 exposed by food consumed from top surface 12. It is not critical for the numerical markings 58 on the back of pillar-like support members 6 and 42 to be consecutive, and it is also contemplated for numerical markings 58 to represent points that a child acquires toward an independent goal, and instead of finding a prize within hidden compartment 56, a card or ticket identifying a specified or randomly determined number of points could be located within selected hidden compartments 56. Further, although not shown, the hidden compartments 56 could have letter markings, or words, thereon to identify the location of condiments, utensils such as those shown by the number 40 in FIG. 7, or a napkin.

Figure 10:
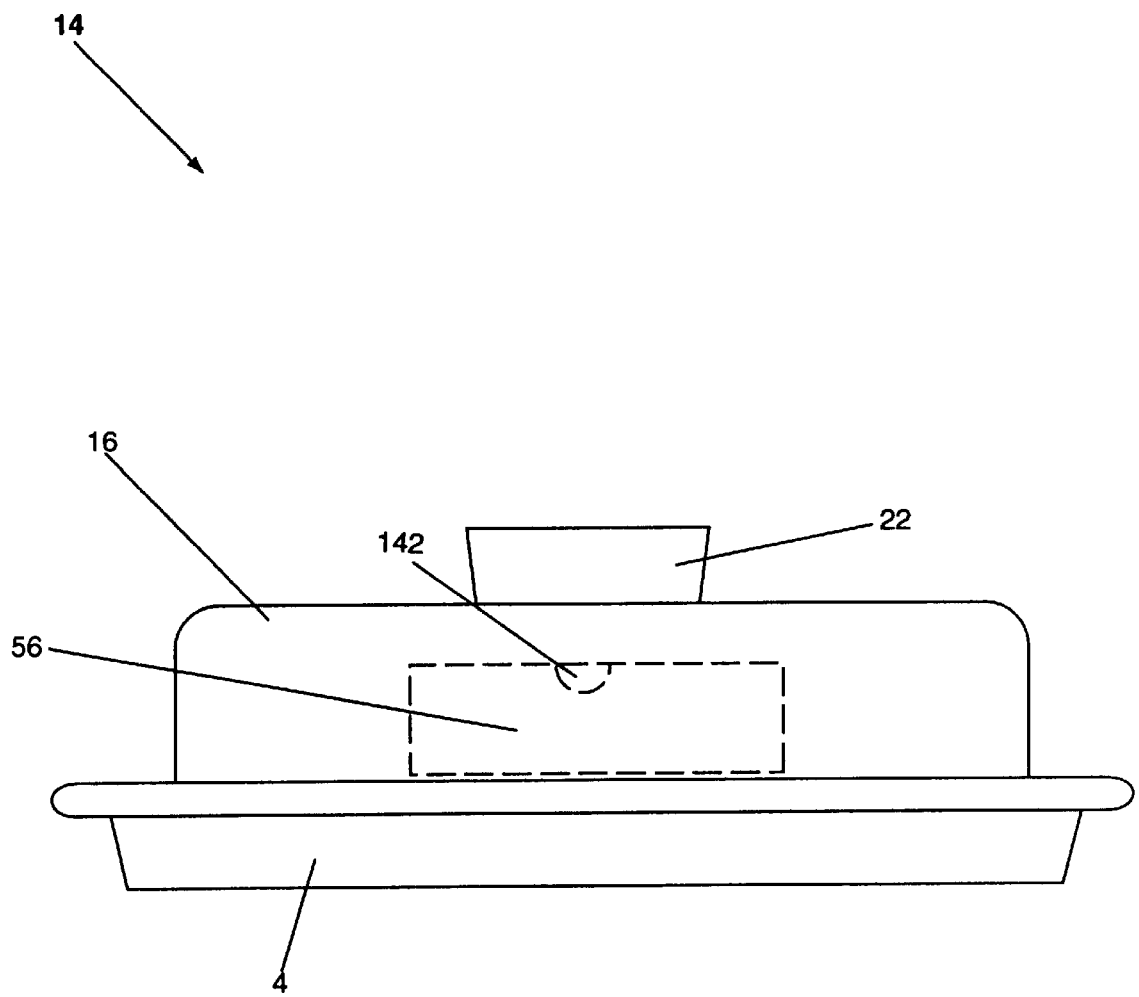
FIG. 10 is a rear view of the second preferred embodiment of the present invention having either modular components or a one-piece molded construction, previously shown in FIG. 2, with one platform-like support member having an arcuate perimeter configuration and being attached to the top surface of a plate-like base member in a position remote from a user, the platform having one centrally positioned hidden compartment accessible through its rear surface.

FIG. 10 shows the rear surface of second preferred embodiment 14, previously shown in FIG. 2, having either modular components or a one-piece molded construction and a platform-like support member 16 with one rearwardly positioned large hidden compartment 56. Although not shown, it is contemplated for hidden compartment 56 to hold one or more objects, such as condiments, utensils 40, a napkin, a gift/promotional item, tickets, small toy 64 or 84, or a prize/reward. FIG. 10 shows platform-like support member 16 having an arcuate perimeter configuration and being attached to the top surface of plate-like base member 4 in a position remote from a user, as well as being able to securely position a cup 22. The use of one large hidden compartment 56 is not critical to the second preferred embodiment 14 and two or more smaller hidden compartments 56 could also be used. Further, although FIG. 10 shows hidden compartment 56 to open in a downwardly direction, it is also contemplated for any of the hidden compartments 56 in second preferred embodiment 14 to open in an upwardly direction, in a horizontal direction, have outwardly bi-folding doors, or have a sliding panel. FIG. 10 shows hidden compartment 56 having a cutout/notch 142 for use as a finger-hold for ease in separating the cover of hidden compartment 56 from platform-like support member 16. The size and configuration of cutout/notch 142 is not critical, as long as it allows for easy opening of hidden compartment 56,. Although not shown, it is also considered within the scope of the second preferred embodiment 14 for the hidden compartments 56 to have numerical markings 58 thereon, geometric markings 62, as well as alphabetical markings, to include word markings 126 shown in FIG. 21. FIG. 10 further shows hidden compartment 56 having a cutout/notch 142 for use as a finger-hold in opening it. The size and configuration of cutout/notch 142 are not critical.

Figure 11:
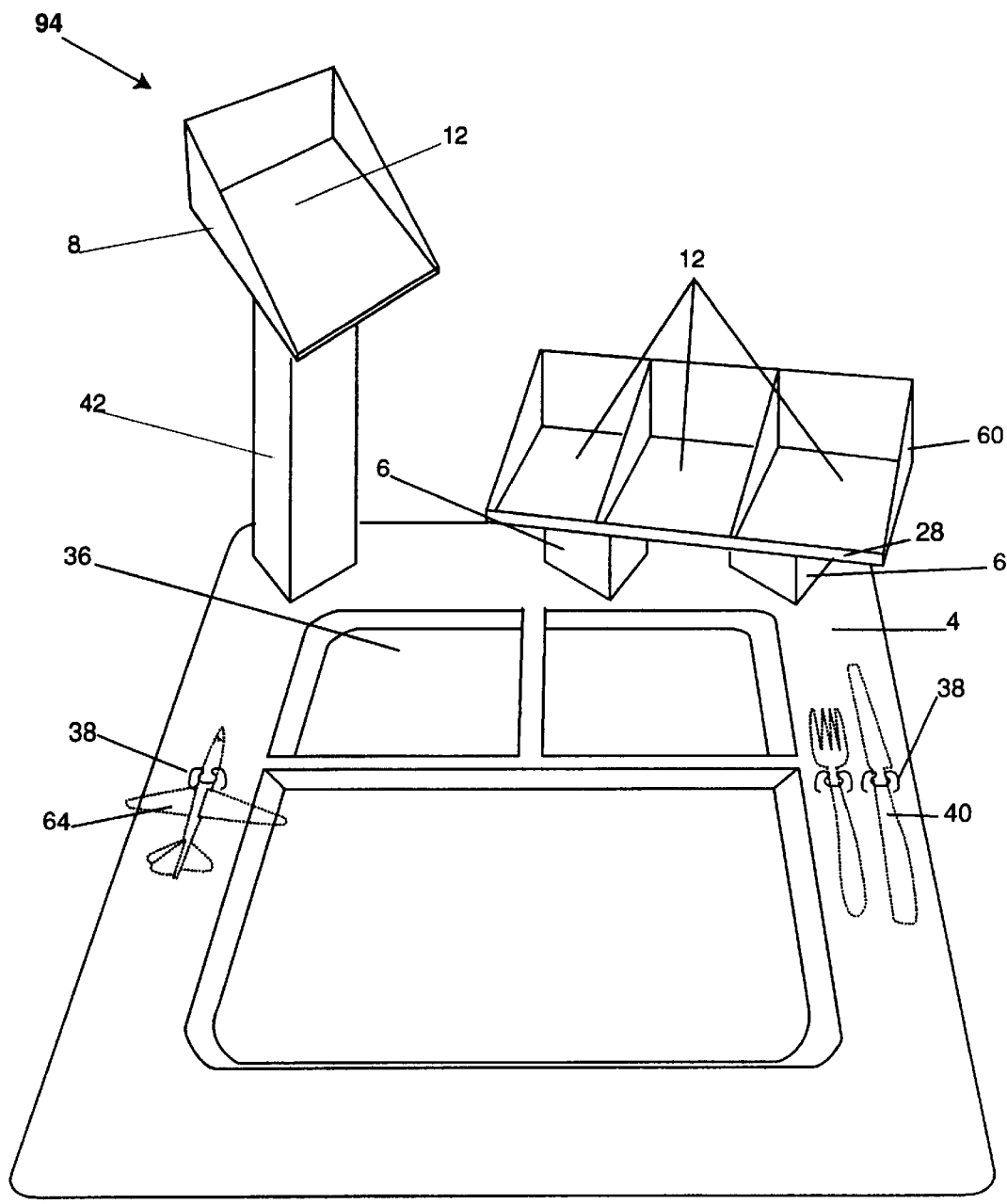
FIG. 11 is a front perspective view of a seventh preferred embodiment of the present invention having either modular components including one tray-like elevated eating surface having side and back walls attached to the top surface of a compartmentalized plate-like base member by a tall pillar-like support member, and a second elongated compartmentalized elevated eating surface attached to the top surface of the plate-like base member by two smaller pillar-like support members, all three pillar-like support members being in a substantially aligned position remote from a user, the elevated eating surfaces being dimensioned for holding a beverage or soup container, food, or a small toy, the plate-like base member also having fastening means laterally on its top surface for the attachment of utensils and/or toy-sized objects.
Figure 12:
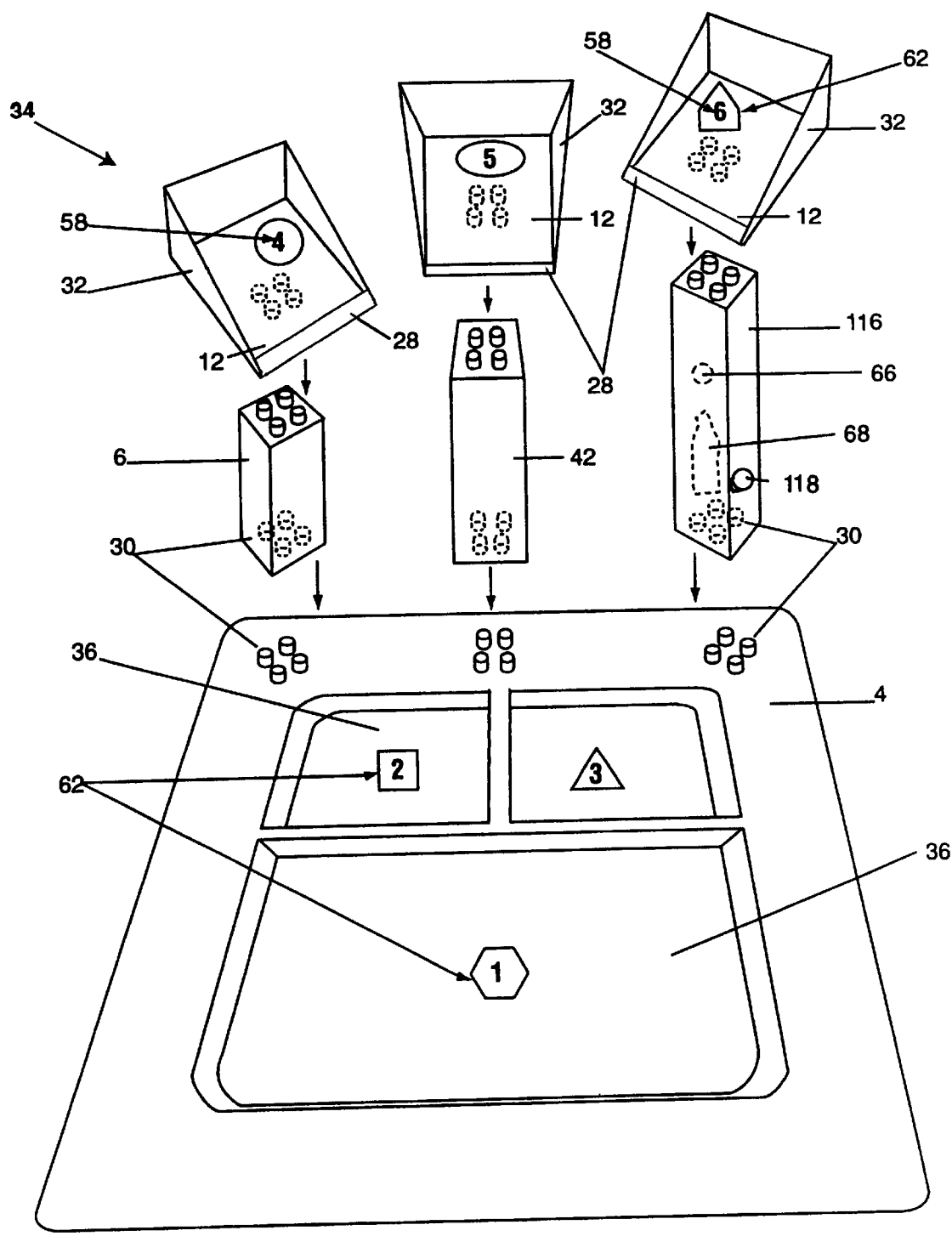
FIG. 12 is an exploded front perspective view of the fourth preferred embodiment of the present invention having either modular components, previously shown in FIGS. 4 and 9, with three elevated eating surfaces each attached to the top surface of a compartmentalized plate-like base member by a pillar-like support member in a substantially aligned position remote from a user, the adjacent elevated eating surfaces being supported by progressively taller pillar-like support members, the elevated eating surfaces also each having side and back walls, and a slightly raised front edge, and being dimensioned for holding a beverage or soup container, food, or a small toy, with geometric shapes and a progressive series of numerical markings being displayed on the top surface of the food-holding compartments in the plate-like base member, as well as on the food-holding top surface of each of the elevated eating surfaces, with the highest numerical marking being positioned on the highest elevated eating surface, the tallest pillar-like support member also having a hidden speaker, a visible activation switch, and a hidden unit comprising a direct current power supply and a microchip for interactive communication with the user.

FIG. 11 shows a seventh preferred embodiment 94 of the present invention as a multiple-level eating surface apparatus for individuals, which has food-holding surfaces at three different elevations. The seventh preferred embodiment 94 can either be made from assembled modular components or made as a one-piece unit through molded construction. FIG. 11 shows the seventh preferred embodiment 94 having a plate-like base member 4, one tray-like elevated eating surface 8 with side and back walls, a tall pillar-like support member 42, two pillar-like support members 6, and one elongated compartmentalized elevated eating surface 60. Tray-like elevated eating surface 8 is attached to the top surface of plate-like base member 4 in a position remote from a user (not shown) through use of tall pillar-like support member 42, while elongated compartmentalized elevated eating surface 60 is attached with two shorter pillar-like support members 6. Also, FIG. 11 shows tray-like elevated eating surface 8 having one top surface 12, while elongated compartmentalized elevated eating surface 60 is shown to have several separated and distinct food-holding top surfaces 12. FIG. 11 further shows a plate-like base member 4 having two small and one large compartmentalized indentations 36. The number, size, and positioning of compartmentalized indentations 36 relative to one another are not critical. In addition, FIG. 11 shows plate-like base member 4 having several quick-release snap-in connectors 38 which allow rapid connection and removal of small objects, such as utensils 40, a napkin (not shown), or an elongated toy 64, from the lateral portions of base member 4. If additional tray-like elevated eating surfaces 8 are used along the sides of plate-like base member 4, snap-in connectors 38 could be more forwardly positioned on plate-like base member 4 than is shown in FIG. 11. Also, although not critical, FIG. 11 further shows pillar-like support members 6 and tall pillar-like support member 42 being approximately aligned along the rear perimeter edge of plate-like base member 4, although neither appears to have outer surfaces parallel to the rear perimeter of plate-like base member 4. The orientation shown in FIG. 11 is not considered critical. While FIG. 11 shows elongated compartmentalized elevated eating surface 60 having a slightly raised front edge 28, the use of slightly raised front edge 28 is not critical and it is also contemplated for the number top surfaces 12 on elongated compartmentalized elevated eating surface 60 to be more or less than three. Also, it is not required for the width dimension of the top surfaces 12 on elongated compartmentalized elevated eating surface 60 to be identical. Other variations in the seventh preferred embodiment 94, although not limited thereto, can include more than two smaller pillar-like support members 6 being used to support elongated elevated eating surface 60, elongated elevated eating surface 60 having more than three top surfaces 12, elongated elevated eating surface 60 being centrally angled for dual positioning along the rear perimeter of plate-like base member 4 as well as along a portion of one side of plate-like base member 4, two tray-like elevated eating surfaces 8 being used with one supported by a tall pillar-like support member 42 and the other being supported by a smaller pillar-like support member 6, two tray-like elevated eating surfaces 8 being used and each supported by a tall pillar-like support member 42, two tray-like elevated eating surfaces 8 being used and each supported by a smaller pillar-like support member 6, and for two or more tall pillar-like support members 42 to be used for support of elongated compartmentalized elevated eating surface 60.

FIG. 12 shows a variation of the fourth preferred embodiment 34 of the present invention, previously shown in FIGS. 4 and 9, which has food-holding surfaces at four different elevations. FIG. 12 shows the variation of the fourth preferred embodiment 34 having modular components including three tray-like modular elevated eating surfaces 32 each poised for attachment to the top surface of a plate-like base member 4 in aligned positions remote from a user. One of the laterally positioned modular elevated eating surfaces 32 is positioned for support by a smaller pillar-like support member 6, the other laterally positioned modular elevated eating surface 32 is positioned for support by the tallest pillar-like support member 116, and the centrally positioned modular elevated eating surface 32 is positioned for support by tall pillar-like support member 42. Modular elevated eating surfaces 32 are dimensioned for holding a beverage, food, or a small toy, such as is shown by the number 64 or 84 respectively in FIGS. 7 and 17, and plate-like base member 4 has compartmentalized indentations 36. Geometric representations 62 and a progressive series of numerical markings 58 are marked on the upper surfaces of compartmentalized indentations 36, as well as on the top surfaces 12 of modular elevated eating surfaces 32. Geometric representations 62 and numerical markings 58 can be centered within a compartmentalized indentation 36 or a top surface 12, or in the alternative they can be positioned any place therein. It is contemplated that geometric representations 62 and numerical markings 58 be used to entertain and teach lessons to children (not shown). FIG. 12 shows the highest numerical marking 58 being positioned on top surface 12 of the modular elevated eating surface 32 having the greatest height dimension. Also, FIG. 12 shows tallest pillar-like support member 116 having a hidden speaker 66, a visible activation switch 118, and a hidden unit 68 having a direct current power supply, microchip, and optional microphone for interactive communication with the user.

Figure 13:
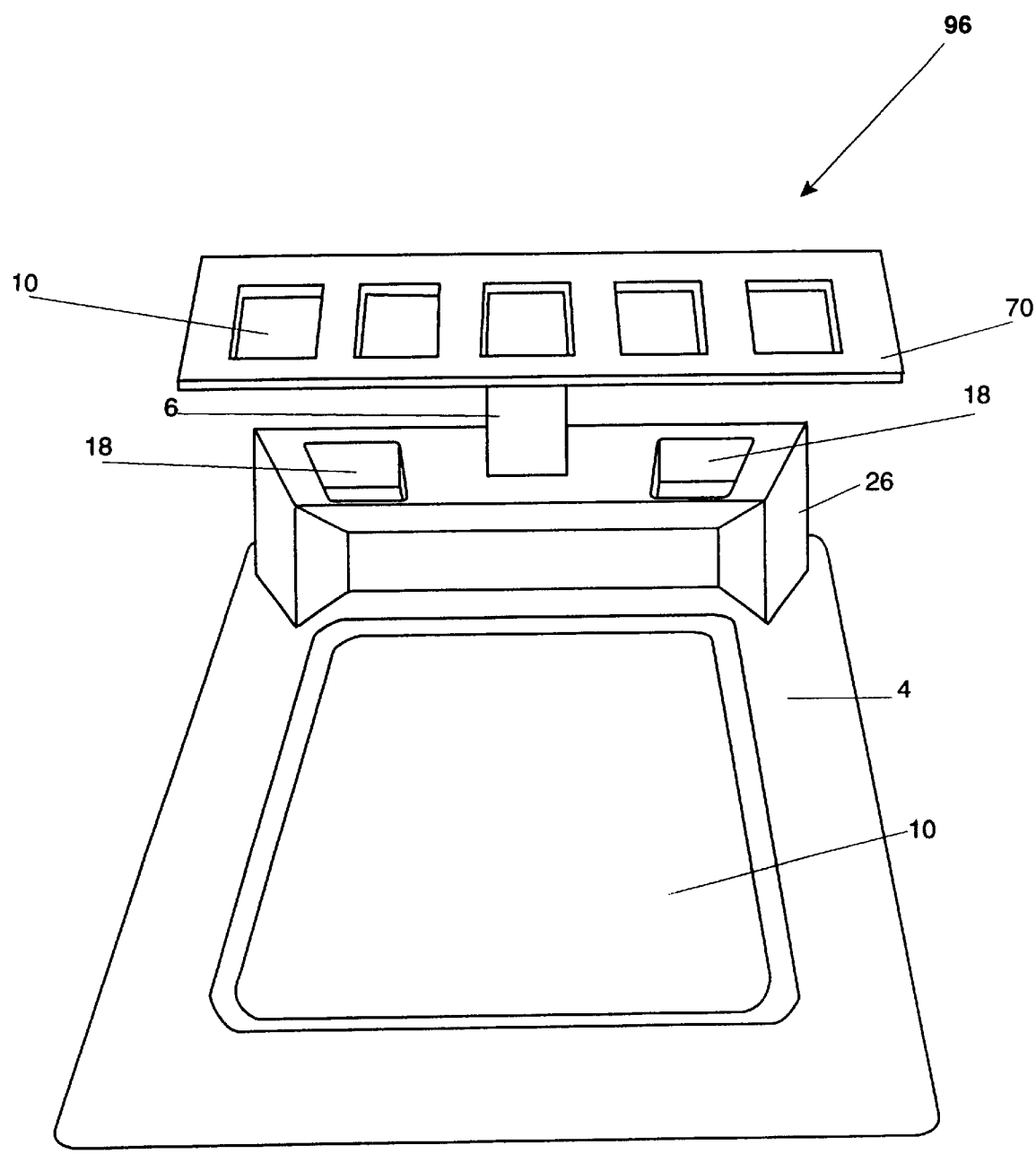
FIG. 13 is a front perspective view of an eighth preferred embodiment of the present invention having either a modular construction or a one-piece molded construction, a plate-like base member, with a platform-like support member attached to the top surface of the plate-like base member in a position remote from a user, two food-holding compartments formed laterally through the upper surface of the platform-like support member, and a single pillar-like support member upwardly depending from the upper surface of the platform-like support member with one elongated eating surface having multiple spaced-apart food-holding indentations being supported centrally upon the pillar-like support member.

FIG. 13 shows an eighth preferred embodiment 96 of the present invention as a multiple-level eating surface apparatus for individuals, which has food-holding surfaces at three elevations and both pillar-like and platform-like components. The eighth preferred embodiment 96 could either be made from assembled modular components or made as a one-piece unit through molded construction. FIG. 13 shows the eighth preferred embodiment 96 having a plate-like base member 4, one substantially rectangular platform-like support member 26 with an angular perimeter configuration and two laterally positioned small capacity food-holding compartments 18 downwardly through its upper surface, one elongated plate-like upper eating surface 70 without side and back walls, and one pillar-like support member 6 centrally positioned between platform-like support member 26 and elongated plate-like upper eating surface 70, wherein elongated plate-like elevated eating surface 70 becomes positioned above platform-like support member 26. Although not critical, the two small capacity food-holding compartments 18 appear to be identical in configuration and size to one another, as well as in position relative to platform-like support member 26. FIG. 13 further shows plate-like base member 4 having a central food-holding indentation 10. Also both platform-like support member 26 and elongated plate-like elevated eating surface 70 are in a position relative to plate-like base member 4 that would be remote from a user (not shown) during food consumption use. Although FIG. 13 shows a single pillar-like support member 6 centrally supporting the bottom of elongated elevated eating surface 70, the number of pillar-like support members 6 used is not critical. Further, although the spaced-apart food-holding indentations 10 on the upper surface of elongated elevated eating surface 70 are shown to be uniformly spaced-apart and similar in size, it is also contemplated for food-holding indentations 10 to be different sizes and have differing spaced-apart distances therebetween. It would be expected for pillar-like support member 6 to have a height dimension adequate for convenient user access to small capacity compartments 18. In the alternative, although not shown, it is also contemplated for variation of the eighth preferred embodiment 96 to have two or more elongated elevated eating surfaces 70 laterally attached to plate-like base member 4, with one or more additional elevated eating surfaces 8 in a position along one or both sides of plate-like base member 4, and/or attached centrally to the upper surface of the elongated elevated eating surface 70 shown in FIG. 13, or one in an inferior position to provide two or more stacked elongated elevated eating surfaces 70. Should two or more stacked elongated elevated eating surfaces 70 be stacked, tabs 128 shown in FIG. 22 could be used to provide enhanced stability to plate-like base member 4. The number of elongated elevated eating surfaces 70 used would be limited by aesthetic appearance and balance considerations.

FIG. 14 shows a ninth preferred embodiment 98 of the present invention as a multiple-level eating surface apparatus for individuals, which has food-holding surfaces at three elevations. The ninth preferred embodiment 98 could either be made from assembled modular components or made as a one-piece unit through molded construction. FIG. 14 shows the ninth preferred embodiment 98 having a tray-like base member 74, one 3-D relief platform-like support member 76 in the shape of a dinosaur with two small capacity compartments 18 extending downwardly through the back of dinosaur-shaped platform-like support member 76 and each small capacity compartment 18 being dimensioned for holding food, a beverage container such as cup 22 in FIG. 2, or a small toy such as toy 64 or 84 in FIGS. 7 and 17 respectively. FIG. 14 also shows one tray-like elevated eating surface 8 with side and back walls and an exposed top surface 12 attached at an angle to an arcuate pillar-like support member 114 in the shape of a dinosaur tail. Although not critical, the two small capacity compartments 18 appear to be identical in configuration and size to one another. Also, although not shown, at least one small capacity compartment 18 could be positioned on the hidden opposed side of dinosaur-shaped platform-like support member 76 for use in hiding a reward or dessert from a child until a sufficient amount of other food had been consumed from tray-like base member 74, small capacity compartments 18, or top surface 12. FIG. 14 shows dinosaur-shaped platform-like support member 76 being attached to the top surface of tray-like base member 74 in a position remote from a user. The number of tray-like elevated eating surfaces 8 supported by dinosaur tail support member 114 is not critical, nor is the angle at which the tray-like elevated eating surfaces 8 are supported, as long as food is able to remain stably upon on top surfaces 12 until consumption and top surfaces 12 remain conveniently accessible to a user. Also, although not shown, it is contemplated for any or all of the tray-like elevated eating surfaces 8 used to be detachable from dinosaur tail support member 114, for more convenient access to its contents. FIG. 14 also shows a cup 22 for beverages, soup, pudding, gelatin, and the like, supported by tray-like base member 74 between the feet of dinosaur-shaped platform-like support member 76. If transport of tray-like base member 74 is contemplated, although not shown, a ridge, recess, or crossbar made from plastic or other material could be provided between the feet of dinosaur-shaped platform-like support member 76 to further support and balance cup 22 from the rear. In those ninth preferred embodiments 98 which are modular, dinosaur-shaped platform-like support member 76 could be optionally removable from tray-like base member 74, and elevated eating surfaces 8 could be optionally removable from dinosaur tail support member 114, so that dinosaur-shaped platform-like support member 76 could be used as a toy. Although not shown, it is considered to be within the scope of ninth preferred embodiment 98 for dinosaur-shaped platform-like support member 76 to have features for interactive communication with the user, similar to the speaker 66, activation switch 118, and a hidden unit 68 having a direct current power supply, microchip, and optional microphone, as shown in FIG. 12.

FIG. 15 shows a tenth preferred embodiment 100 of the present invention as a multiple-level eating surface apparatus for individuals, which has food-holding surfaces at two elevations. The tenth preferred embodiment 100 could either be made from assembled modular components or made as a one-piece unit through molded construction. FIG. 15 shows the tenth preferred embodiment 100 having an octagon-shaped plate-like base member 54 with a depression 112 therein configured for secure upright support a cup 22 for beverages, soup, food intended to be eaten with one's fingers, and the like; two octagon-shaped plate-like elevated eating surfaces 78 each with central indentations 52 therein but without side and back walls; and two hexagon-shaped pillar-like support members 80. Although not critical, the two octagon-shaped plate-like elevated eating surfaces 78 appear to be identical in configuration and size to one another, as do the two hexagon-shaped pillar-like support members 80. Each octagon-shaped plate-like elevated eating surface 78 is attached to the top surface of octagon-shaped plate-like base member 54 in a position remote from a user with a different one of the hexagon-shaped pillar-like support members 80, with each of the octagon-shaped plate-like elevated eating surfaces 78 centered above the hexagon-shaped platform-like support member 80 to which it is attached. Although FIG. 15 shows octagonal and hexagonal components, variations of the tenth embodiment 100 could comprise elevated eating surfaces 78, plate-like base members 54, food-retaining indentations 52 and pillar-like support members 80 in any combination of rectangular and non-rectangular configurations. Further, although its shape and size are not critical, FIG. 15 also shows octagon-shaped plate-like base member 54 having an octagon-shaped central indentation 52. The use of two non-rectangular pillar-like support members 80, their placement relative to one another on octagon-shaped plate-like base member 54, and the use of substantially planar elevated eating surfaces 78 are also not critical.

Figure 16:
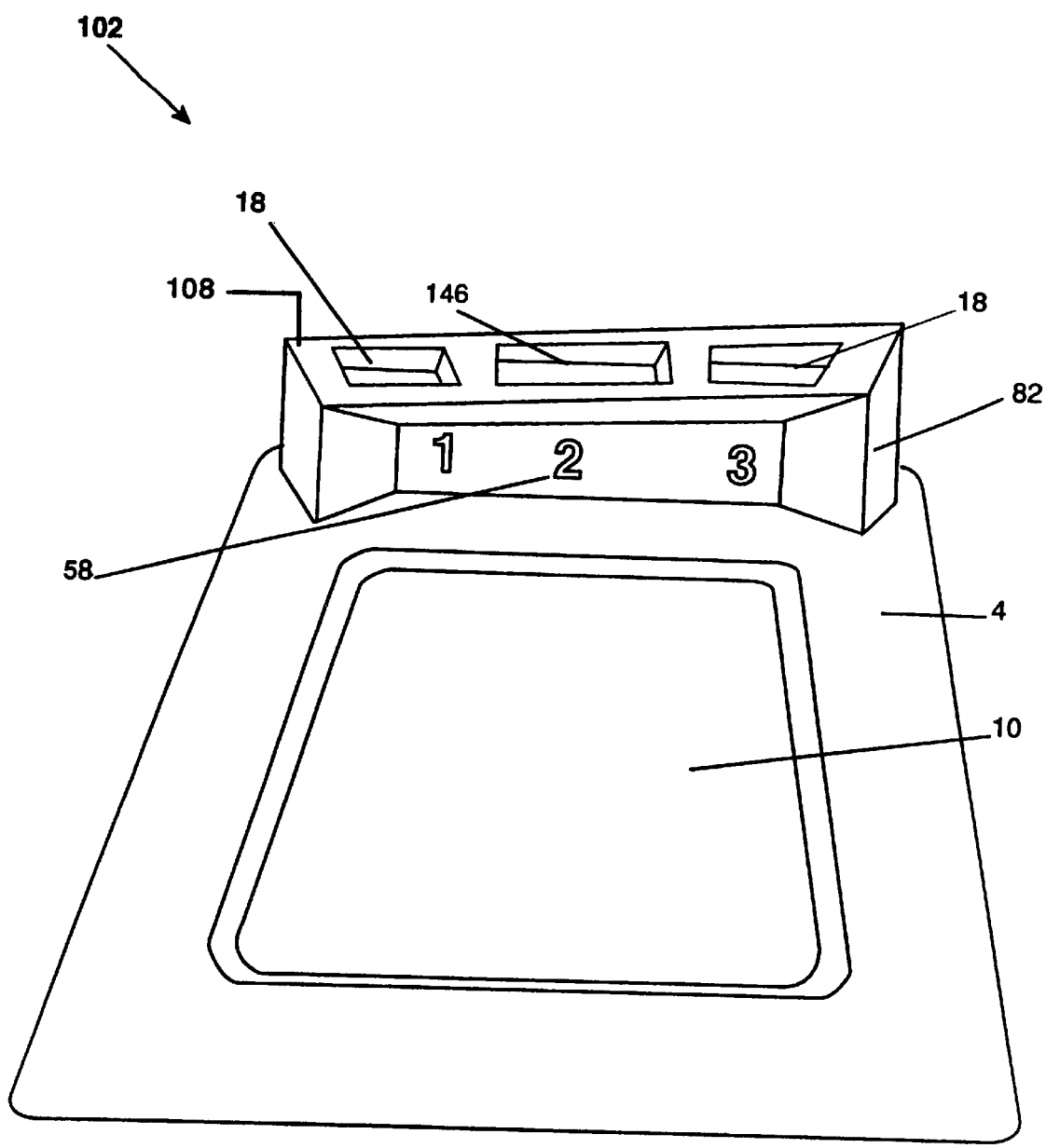
FIG. 16 is a front perspective view of a eleventh preferred embodiment of the present invention having a one-piece molded construction, a plate-like base member with one platform-like support member having an inclined upper surface that is attached to the top surface of the plate-like base member in a position remote from a user, the platform-like support member having three compartments extending downwardly through its top surface which are dimensioned for holding a beverage or soup container, food, or a small toy, with progressively higher numerical markings on the front of the platform-like support member each in a position related to one of the compartments.

FIG. 16 shows an eleventh preferred embodiment 102 of the present invention as a multiple-level eating surface apparatus for individuals, which has food-holding surfaces at four elevations. The eleventh preferred embodiment 102 could either be made from assembled modular components or made as a one-piece unit through molded construction. FIG. 16 shows the eleventh preferred embodiment 102 having a plate-like base member 4, and one substantially platform-like support member 82 with two small capacity compartments 18 downwardly positioned through an inclined upper surface 108 and one larger compartment 146 centrally positioned therebetween, each dimensioned for holding a beverage, food, or a small toy. Although not shown, easily removable rectangular-shaped beverage containers could be positioned within small capacity compartments 18 or larger compartment 146, or in the alternative a beverage could be poured directly into small capacity compartments 18 or larger compartment 146 and consumed through a straw. Although not critical, the two small capacity compartments 18 appear to be similar in configuration and size to one another. FIG. 16 further shows plate-like base member 4 having a central food-holding indentation 10, with inclined platform-like support member 82 having an angled perimeter configuration and being attached to the top surface of plate-like base member 4 in a position remote from a user (not shown). Although two small capacity compartments 18 and one larger compartment 146 are shown, the number of each is not critical and variations of the eleventh preferred embodiment can include inclined platform-like support member 82 having more or less than two small capacity compartments 18. Also, more than one inclined platform-like support member 82 could be used with additional inclined platform-like support members 82 in opposed positions along the sides of plate-like base member 4, and one or more inclined platform-like support members 82 could be centrally angled to extend around one or both rear corners of plate-like base member 4. Although not shown in FIG. 16, it is contemplated for liner/inserts 44 to be used in any small capacity compartment 18, when needed to vertically extend its food-holding capacity. FIG. 16 also shows progressively higher numerical markings 58 on inclined platform-like support member 82 in front of each small capacity compartment 18 and larger compartment 146, with the lowest numerical marking 58 in front of the small capacity compartment 18 having the smallest height dimension. However, the use of consecutive numerical markings 58 and their placement on inclined platform-like support member 82 is not critical. In the alternative, numerical markings 58 could be omitted, placed upon inclined upper surface 108, or placed on the top surface of plate-like base member 4.

Figure 17:
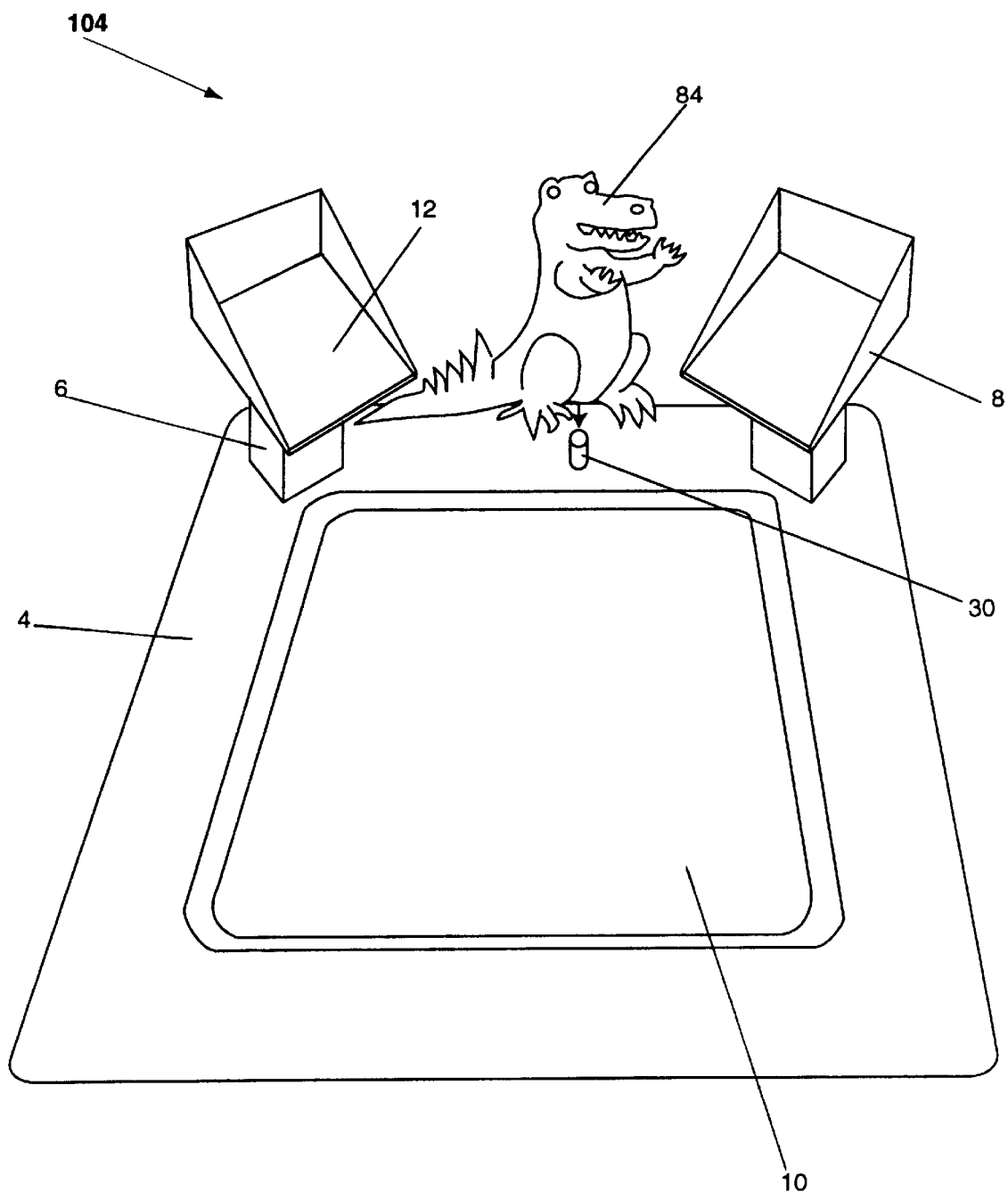
FIG. 17 is a front perspective view of a twelfth preferred embodiment of the present invention having either modular components or a one-piece molded construction, with two tray-like elevated eating surfaces having side and back walls, each attached to the top surface of a plate-like base member through use of by a pillar-like support member in a different corner of the plate-like base member remote from a user, and a toy in the shape of a dinosaur poised for detachable connection to the remote perimeter of the plate-like base member between the two elevated eating surfaces.

FIG. 17 shows a twelfth preferred embodiment 104 of the present invention as a multiple-level eating surface apparatus for individuals, which has food-holding surfaces at two elevations. The twelfth preferred embodiment 104 could either be made from assembled modular components or made as a one-piece unit through molded construction. FIG. 17 shows the twelfth preferred embodiment 104 having a plate-like base member 4; two tray-like elevated eating surfaces 8 each with side and back walls, and a top surface 12; and two pillar-like support members 6. Although not critical, the two tray-like elevated eating surfaces 8 appear to be identical in configuration and size to one another, as do the two pillar-like support members 6. Also, more or less that two tray-like elevated eating surfaces 8 and pillar-like support members 6 can be used. FIG. 17 shows each tray-like elevated eating surface 8 being attached to the top surface of plate-like base member 4 with a different one of the pillar-like support members 6. FIG. 17 further shows two elevated eating surfaces 8 each attached to the top surface of a plate-like base member 4 by a pillar-like support member 6 in a corner of plate-like base member 4 remote from a user. A toy 84 in the shape of a dinosaur is shown in FIG. 17 being detachably connected to the plate-like base member 4 between the two pillar-like support members 6 with a quick-release protruding snap-together connection 30. Neither corner placement of elevated eating surfaces 8, nor detachable connection of toy 84 are critical. Variations in the twelfth preferred embodiment 104 can include, but are not limited to, use of pillar-like support members 6 having different height dimensions, a tray-like base member 74, a hidden compartment 56 in toy 84, and the positioning of pillar-like support members 6 adjacent to one another with the dinosaur-shaped toy 84 set off to the left or right thereof.

FIG. 18 shows a thirteenth preferred embodiment 106 of the present invention as a multiple-level eating surface apparatus for individuals, which has food-holding surfaces at two elevations. The thirteenth preferred embodiment 106 could either be made from assembled modular components or made as a one-piece unit through molded construction. FIG. 18 shows the thirteenth preferred embodiment 106 having a plate-like base member 4, two bowl-like elevated eating surfaces 88, and two 3-D relief pillar-like support members 86 in the shape of dinosaurs. Although not critical, the two bowl-like elevated eating surfaces 88 appear to be similar in configuration and size to one another, as do the two dinosaur-shaped support members 86. Each bowl-like elevated eating surface 88 is attached to the top surface of plate-like base member 4 with a different one of the dinosaur-shaped support members 86. As variations of thirteenth preferred embodiment 106, although not limited thereto, it is contemplated for more than two dinosaur-shaped support members 86 to be used, for one or more dinosaur-shaped support members 86 to support more than one bowl-like elevated eating surfaces 88, and for the dinosaur-shaped support members 86 used to vary in height dimension. FIG. 18 also shows both dinosaur-shaped support members 86 to be similar in height and attached to the top surface of a plate-like base member 4 having a central food-holding indentation 10. Plate-like base member 4 is wide-rimmed, rectangular shaped, and dinosaur-shaped support members 86 are each positioned in a different corner of plate-like base member 4 remote from a user. The use of plate-like base member 4 with a central food-holding indentation 10 is not critical, nor is the shape of its perimeter configuration, and it is also contemplated for tray-like base member 74 to be used, or a plate-like base member 4 with compartmentalized indentations 36, as well as octagonal plate-like base member 54, or a base member having other perimeter configurations such as round, oval, hexagonal, or an irregular curvilinear configuration. Also, the number and size of dinosaur-shaped support members 86 used, as well as the shape of bowl-like elevated eating surfaces 88, are not critical to the present invention. Therefore, two variations of the thirteenth preferred embodiment could include bowl-like elevated eating surfaces 88 with a square configuration or bowl-like elevated eating surfaces 88 which are compartmentalized. Also, in FIG. 18 dinosaur-shaped support members 86 are facing one another with bowl-like elevated eating surfaces 88 also facing each other. In the alternative, bowl-like elevated eating surfaces 88 could be facing away from a user to protect dessert items or a prize from an anxious child, so that when the child is finished eating a satisfactory portion of the food on plate-like base member 4, the thirteenth preferred embodiment could be turned for easy access to one or both bowl-like elevated eating surfaces 88. It is equally contemplated for dinosaur-shaped support members 86 to have a variety of other orientations relative to plate-like base member 4 and each other, including orientations wherein bowl-like elevated eating surfaces 88 are facing toward a user. Further, although not critical, bowl-like elevated eating surfaces 88 can be optionally separable from dinosaur-shaped support members 86, and dinosaur-shaped support members 86 optionally separable from plate-like base member 4. Also, although not shown, dinosaur-shaped support members 86 can optionally have a hidden compartment 56. Further, the support members for bowl-like elevated eating surfaces 88 used in the thirteenth preferred embodiment 106 are not limited to dinosaur-shaped support members 86, and they can comprise a variety of shapes relating to holiday themes, as well as physical structures, such as but not limited to medieval castles, spaceships, or soccer stadiums. Also although not shown, plate-like base member 4 can be decorated, such as with decals, printing, and 3-D relief, to complement the theme of the 3-D relief support members used in any preferred embodiment of the present invention, such as but not limited to dinosaur-shaped support members 86.

FIG. 19 shows a fourteenth preferred embodiment 130 of the present invention as a multiple-level eating surface apparatus for individuals, made from modular components, which has food-holding surfaces at three different elevations. FIG. 19 shows the fourteenth preferred embodiment 130 having a plate-like base member 4, four modular elevated eating surfaces 32, two smaller pillar-like support members 6, and two tall pillar-like support members 42 each joined to the other by a single horizontally extending crossbar 140. Although the use of horizontally extending crossbar 140 is not critical, it is contemplated for horizontally extending crossbar 140 to be employed where the structure or contoured 3-D relief of the fourteenth preferred embodiment 130 would require additional stability for effective use. Where appropriate according to design considerations, horizontally extending crossbar 140 could comprise more that one horizontally extending member, such as but not limited to the need for horizontally extending crossbar 140 to have a fence-like appearance. Also, if more than two tall pillar-like support members 42 would be used, horizontally extending crossbars 140 could extend between each of the adjacent tall pillar-like support members 42. Depending upon the structure and contoured 3-D relief of the fourteenth preferred embodiment 130, horizontally extending crossbars 140 could also extend between tall pillar-like support members 42 and an adjacent smaller pillar-like support member 6, in addition to or in place of a similar connection between adjacent tall pillar-like support members 42. When horizontally extending crossbars 140 are used between tall pillar-like support members 42 and adjacent smaller pillar-like support members 6 in fourteenth preferred embodiment 130, the positioning of tall pillar-like support members 42 and smaller pillar-like support members 6 can be reversed, with tall pillar-like support members 42 laterally positioned relative to plate-like base member 4 and the smaller pillar-like support members 6 being centrally located. The elevation at which horizontally extending crossbars 140 are secured between adjacent tall pillar-like support members 42 and smaller pillar-like support members 6 would vary according to design and structural load considerations. Further, it is contemplated that horizontally extending crossbars 140 could be permanently fixed between adjacent pillar-like support members 42 or 6, or in the alternative horizontally extending crossbars 140 could be readily detachable from adjacent pillar-like support members 42 or 6, such as through the snap-together type of connection 30 shown for modular components of the present invention in FIG. 4. The configuration of the snap-together connection 30 used would not critical and it is considered within the scope of the present invention for snap-together connections 30 to have any number of protrusions and indentations in any pattern that securely locks modular components in place during use yet allows them to be easily releasable upon demand. FIG. 19 shows two of the modular elevated eating surfaces 32 each being connected to a different one of the smaller pillar-like support members 6, with the remaining two modular elevated eating surfaces 32 each being connected to a different tall pillar-like support member 42. FIG. 19 also shows the two smaller pillar-like support members 6 being attached laterally to the rear perimeter edge of base member 4 in positions opposed to one another, with the two tall pillar-like support members 42 being shown poised for attachment centrally to the rear perimeter edge of base member 4 through the use of clips 138. Prior to attachment of the two tall pillar-like support members 42 to plate-like base member 4, the arrows in FIG. 19 show that the joined tall pillar-like support members 42 must be rotated so that the biasing surfaces 148 of clips 138 can be made to come in contact with the lower rear perimeter edge of plate-like base member 4. It is contemplated for clips 138 to be either molded as part of its attached pillar-like support member 6 or 42, as shown in FIG. 19, or provided as a separate detachable unit or one that becomes fixed to the bottom surface of a pillar-like support member 6 or 42 through the use of adhesives or bonding agents (not shown). It is contemplated for clip 138 to be flexible and/or otherwise biased to firmly connect the attached smaller pillar-like support members 6 or tall pillar-like support member 42 to the rear perimeter edge of plate-like base member 4. The configuration of the biasing surface 148 of each clip 138 can be substantially planar, convex, curvilinear, or inclined to provide a wedge shaped clip 138 with a thick distal end. The biasing surfaces 148 of clips 138 can also be made in a variety of configurations that allow retrofitting to conventional dinnerware (not shown), including the perimeter edges of plates and large soup bowls, so that a specially designed wide-rimmed plate-like base member 4 or 54 is not required. Although not critical, the four modular elevated eating surfaces 32 appear to be tray-like, as well as identical in configuration and size. Each modular tray-like elevated eating surface 32 would be appropriately dimensioned for holding a beverage, food, or a small toy such as toys 64 and 84 shown respectively in FIGS. 7 and 17. FIG. 19 also shows the two smaller pillar-like support members 6 each having a hidden compartment 56 with a cutout/notch 142 for use as a finger-hold for separating the cover of hidden compartment 56 from the remaining portion of smaller pillar-like support members 6. The height dimension of the two smaller pillar-like support members 6 relative to tall pillar-like support members 42 is not critical, and the use of hidden compartments 56 in smaller pillar-like support members 6 and tall pillar-like support members 42 is considered optional.

FIG. 20 shows a fifteenth preferred embodiment 132 of the present invention as a multiple-level eating surface apparatus for individuals which has food-holding surfaces at four elevations. The fifteenth preferred embodiment 132 could either be made from assembled modular components or made as a one-piece unit through molded construction. FIG. 20 shows fifteenth preferred embodiment 132 having a substantially rectangular plate-like base member 4 with a substantially rectangular food-holding indentation 10 centrally therein and one platform-holding pillar-like support member 116 centrally attached to the rear perimeter edge of plate-like base member 4 in a position remote from a user. While FIG. 20 shows three non-compartmentalized platform-like elevated eating surfaces 120 each having one of its ends connected to the platform-holding pillar-like support member 116 and horizontally extending from the platform-holding pillar-like support member 116 in an offset position from the others at different elevations, it is equally contemplated in variations of fifteenth preferred embodiment 132 to have less than or more than three non-compartmentalized platform-like elevated eating surfaces 120, and when more than three are present, for at least two to be connected to platform-holding pillar-like support member 116 in opposed directions from the other at a substantially similar elevation. Further, although not shown, no top non-compartmentalized platform-like elevated eating surface 120 is required, and the upper surface of platform-holding pillar-like support member 116 could be left open to receive a cup 22, insert/liner 44, a flower (not shown), or otherwise be ornamented or configured as part of a decorative theme. Although not critical, all of the non-compartmentalized platform-like elevated eating surfaces 120 appear to be similar in configuration with front and back edges that are substantially parallel to one another for placement of food items contemplated for eating with one's fingers such as sushi, bread, muffins, and/or dessert items such as cookies, petit fours, candy, tarts, and cake. As further variations of fifteenth preferred embodiment 132, although not limited thereto, it is contemplated that two platform-holding pillar-like support members 116 substantially similar to that illustrated in FIG. 20 could be used, each in an opposed position to the other and perhaps somewhat reduced in size, with the bottom edge of each platform-holding pillar-like support member 116 located in a different one of the rear corners of plate-like base member 4 and optionally positioned so that the non-compartmentalized platform-like elevated eating surfaces 120 attached to each platform-holding pillar-like support member 116 are at an approximate 90° angle from non-compartmentalized platform-like elevated eating surfaces 120 on the opposing platform-holding pillar-like support member 116 and the food items (not shown) thereon are conveniently accessed by a user. Also, in the fifteenth preferred embodiment 132, the number of non-compartmentalized platform-like elevated eating surfaces 120 is not critical and it is contemplated to have a single non-compartmentalized platform-like elevated eating surface 120, two such eating surfaces 120, more than three offset non-compartmentalized platform-like elevated eating surfaces 120, or more than one set of opposed non-compartmentalized platform-like elevated eating surfaces 120 attached to platform-holding pillar-like support member 116 at the substantially the same elevation. Among other factors to be considered in the configuration of fifteenth preferred embodiment 132 are the number of non-compartmentalized platform-like elevated eating surfaces 120 used for the present invention being limited by balance considerations and aesthetic appeal. Also not critical are the spaced-apart distances of non-compartmentalized platform-like elevated eating surfaces 120 relative to plate-like base member 4 and to the other non-compartmentalized platform-like elevated eating surfaces 120 attached to the same platform-holding pillar-like support member 116, as long as food (not shown) placed thereon remained conveniently accessible to a user. Further, although not shown, non-compartmentalized platform-like elevated eating surfaces 120 and platform-holding pillar-like support members 116 could replace or be added to the support members and elevated eating surfaces in any of the other preferred embodiments disclosed herein or considered to be within the scope of the present invention.

FIG. 21 shows a sixteenth preferred embodiment 134 of the present invention as a multiple-level eating surface apparatus for individuals, which has food-holding surfaces at four elevations. The thirteenth preferred embodiment 106 could either be made from assembled modular components or made as a one-piece unit through molded construction. FIG. 21 shows the sixteenth preferred embodiment 134 having a plate-like base member 4 with a substantially centered food-holding indentation 10, one multi-tiered platform-like elevated eating surface 122 for holding food at three separate elevations above plate-like base member 4, and at least one platform-holding pillar-like support member 116 connected between multi-tiered platform-like elevated eating surface 122 and plate-like base member 4 to position multi-tiered platform-like elevated eating surface 122 centrally along the rear perimeter edge of plate-like base member 4 in a position remote from a user. Although not critical, in FIG. 21 the individual tiers in multi-tiered platform-like elevated eating surface 122, each holding food at a separate and distinct elevation above plate-like base member 4, appear to be similar in configuration and size to one another. In the alternative, the upper tiers in multi-tiered platform-like elevated eating surface 122 could progressively increase or decrease in size. Further, the tiers in multi-tiered platform-like elevated eating surface 122 could be opaque, translucent, transparent, or a combination thereof. Also, although not critical, FIG. 21 shows one platform-holding pillar-like support member 116 supporting the middle tier in multi-tiered platform-like elevated eating surface 122. Depending on balance and aesthetic appearance considerations, one or more platform-holding pillar-like support members 116 could be used in variations of the sixteenth preferred embodiment 134, with platform-holding pillar-like support members 116 being positioned under any or more than one of the individual tiers in multi-tiered platform-like elevated eating surface 122. Further, although it is contemplated for the individual tiers in multi-tiered platform-like elevated eating surface 122 to be substantially horizontally extending, it is also considered to be within the scope of the present invention for the individual tiers in multi-tiered platform-like elevated eating surface 122 to be attached at an oblique angle to platform-holding pillar-like support member 116 as long as food placed on multi-tiered platform-like elevated eating surface 122 would remain in a stable position thereon until consumed. FIG. 21 also shows an upwardly depending extension 124 attached to the rear surface of the highest tier in multi-tiered platform-like elevated eating surface 122 and extending the full width dimension of multi-tiered platform-like elevated eating surface 122. FIG. 21 further shows word markings 126 on the surface of upwardly depending extension 124 facing a user. It is also considered to be within the scope of the sixteenth preferred embodiment 134 for upwardly depending extension 124 to have a width dimension less than that of multi-tiered platform-like elevated eating surface 122, and for upwardly depending extension 124 to comprise word markings 126 on its back surface for viewing by an individual facing the user, as well as geometric markings 62, numerical markings 58, and other decorative marking (not shown) relating to a specific theme, such as but not limited to a movie promotion, business logo, advertising campaign, and holiday traditions. Other variations in the sixteenth preferred embodiment can include, but are not limited to, use of two multi-tiered platform-like elevated eating surfaces 122, each in an opposed position to the other and perhaps somewhat reduced in size, with each located above a different one of the rear corners of plate-like base member 4 and optionally positioned at a 90° angle from one another so that food (not shown) thereon remains conveniently accessed by a user; use of two multi-tiered platform-like elevated eating surfaces 122 each having a different number of tiers; substitution of a tray-like base member 74 for plate-like base member 4; or the use of one or more platform-holding pillar-like support members 116 having 3-D relief and optionally in the shape of a dinosaur, such as dinosaur-shaped pillar-like support members 86 in FIG. 18. Further, although not shown, multi-tiered platform-like elevated eating surfaces 122 and platform-holding pillar-like support members 116 could replace or be added to the support members and elevated eating surfaces in any of the other preferred embodiments disclosed herein or considered within the scope of the present invention.

FIG. 22 shows a seventeenth preferred embodiment 136 of the present invention as a multiple-level eating surface apparatus for individuals, which has food-holding surfaces at two different elevations. The seventeenth preferred embodiment 136 could either be made from assembled modular components or made as a one-piece unit through molded construction. FIG. 22 shows the seventeenth preferred embodiment 136 having a plate-like base member 4 with a centrally positioned food-holding indentation 10 therein, two tray-like elevated eating surfaces 8 each with side and back walls, and a top surface 12, one pillar-like support member 6 supporting each tray-like elevated eating surface 8, and each pillar-like support member 6 connected to plate-like base member 4 by a substantially planar tab 128 outwardly extending from the rear perimeter edge of plate-like base member 4 in a position remote from a user (not shown). Although not shown, when it is contemplated for tabs 128 to be detachable from plate-like base member 4, a clip 138 similar to that shown in FIG. 19 could be used, or the snap-together type of connection 30 employed in FIG. 4. Further, although FIG. 22 shows two outwardly extending tabs 128 spaced apart from each other, the number is not critical and one or more additional outwardly extending tabs 128 could be positioned between the two such tabs 128 illustrated in FIG. 22, and/or positioned adjacent to the outwardly extending tabs 128 shown in FIG. 22 along the side perimeters of plate-like base member 4. Also, although not shown, one or more of the outwardly extending tabs 128 could have an indentation therein, similar to depression 112 in FIG. 15, for the secure positioning of a cup 22 or one insert/liner 44. Tabs 128 can be used for extending the food supporting surface area of the seventeenth preferred embodiment 136, by allowing more of the surface of plate-like base member 4 to be used for food-holding purposes, as well as stabilizing plate-like base member 4 by providing an outrigger type of function. It is also contemplated for tabs 128 having a clip-on type of connection to be used for extending the food supporting surface area of conventional dinnerware (not shown), including plates and large soup bowls. Also, although not critical, FIG. 22 further shows each outwardly extending tab 128 having a size and configuration that is similar to the others. Thus, it is not contemplated for the size, shape and placement of tabs 128 relative to plate-like base member 4 to be restricted to that shown in FIG. 22. Other variations in the seventeenth preferred embodiment 136, although not limited thereto and not shown, can include plate-like base member 4 having compartmentalized indentations 36; substitution of a tray-like base member 74 for plate-like base member 4; one or more elevated eating surfaces 6 having a slightly raised front edge 28; more than two outwardly extending tabs 128 being used to support an elongated elevated eating surface 60; one or more tray-like elevated eating surfaces 8 being supported by a tall pillar-like support member 42; tabs 128 being attached to plate-like base member 4 with clip-on means in the form of spring material connected to the bottom of each tab 128 and the edge of plate-like base member 4 being positioned between the spring material and the bottom of each tab 128; clip-on means in the form of spring material being connected to the bottom of one or more pillar-like support members 4 for direct attachment to plate-like base member 4, and a horizontally extending brace or crossbar 140 attached between adjacent pillar-like support members 6 connected to plate-like base member 4 by clip-on means, either directly or indirectly, for added balance and stability of the present invention.

Any of the preferred embodiments contemplated by the present invention, and/or disclosed herein, would provide a fun-to-use, versatile eating surface apparatus that would offer multiple levels upon which food could be served to an individual (not shown). The present invention could also be used as a teaching tool for children in a variety of ways. In modular and molded embodiments elevated eating surfaces 8 would be attached to and positioned above the substantially planar surface of plate-like base member 4 or tray-like base member 74 to increase the total surface area available for food placement without at the same time increasing the amount of table space required by the individual to station his or her food until it is consumed. Elevated eating surfaces 8 could be used to separate foods from one another when doing so would improve its presentation, as well as enjoyment by the individual. The reusable modular embodiments preferably would have separable components for easy cleaning and storage. Also, the selection of a base member, whether plate-like 4 or tray-like 74, would depend upon the intended application, and it is equally contemplated for any of the modular or molded embodiments shown and described herein to alternatively comprise a plate-like base member 4, tray-like base member 74, or a base member having any other rectangular or non-rectangular configuration, such as but not limited to octagon-shaped plate-like base member 54 or one having a curvilinear perimeter, that could be used to provide a convenient-to-use eating surface for an individual, and in addition artistically complement a contemplated decorative theme.

Although not shown, the reusable modular and molded embodiments could be made from materials such as plastic, glass, ceramics, metal, and wood. All embodiments can be made to have a variety of sizes, colors, shapes, and levels of transparency from transparent to translucent, as well as opaque. All embodiments can also have the upper eating surfaces at a uniform height or at different elevations. When elevated eating surfaces 8 are positioned at different heights, the present invention can be used to teach children (not shown) to eat new foods by making them work their way up to a reward or a dessert located on the elevated eating surface 8 having the highest position relative to plate-like base member 4. The multiple levels also make the present invention toy-like and therefore useful as a learning tool that captures the interest of children particularly when surface decoration would include the face of a person or character familiar to the child. Different levels of the present invention could have numerical markings 58 with children earning points as food is consumed to reveal the numerical markings 58. Such numerical markings 58 could also assist a child's assembly skills and understanding of logical and mathematical progression. A speaker 66, an activation switch 118, and a unit 68 comprising batteries, a microchip, and an optional microphone, could be placed within one of the pillars or platforms to further enhance the teaching value of the present invention by turning it into a talking character that presented safety related or other important messages to children. Although not shown, surface areas of all the embodiments can be decorated with markings relating to many diverse topics, such as promotion of a movie, business logo, advertising campaign, or a holiday theme. Such decoration could also be contoured where appropriate to provide three-dimensional relief. Further, it is contemplated for at least some of the modular and molded embodiments to have designated areas with quick-release fasteners 38 configured for the attachment of utensils 40 and/or elongated toy-sized objects 64. Further, embodiments of the present invention could comprise a large compartment 72 or a round indentation 112 for placement of a cup 22 for a beverage, soup, foods to be eaten with one's fingers, and the like, as well as a hidden compartment 56 for retention of a condiment, prize, reward, or other surprise.

What is claimed is:

1. A food transport and eating apparatus for use by an individual in the consumption of food items, said apparatus providing an enlarged amount of food supporting surface area while maintaining a space-conserving footprint, said apparatus also providing improved capability for food separation to aesthetically enhance the presentation of the supported food items, as well as to reduce the mixing of foods items which have differing moisture content, temperature, and intensity of flavoring to maximize the original integrity of each prior to consumption, said apparatus comprising:

a rigid base member having a top food-eating surface adapted for the placement and retention of a plurality of food items during transport of said base member;

at least one rigid elevated eating surface, each said elevated eating surface being adapted for the placement and retention of at least one food item during apparatus transport, each said elevated eating surface having a perimeter dimension smaller than said base member; and rigid support means adapted for connecting each said elevated eating surface to said base member in a position so that food items placed upon each said elevated eating surface will remain at a higher elevation than said base member until consumed, said rigid support means also having sufficient cross-sectional and height dimensions providing a hidden compartment usable for containing small toys and condiments.

2. The apparatus of claim 1 wherein said base member is selected from a group consisting of plate-like members having one centrally located food-holding indentation; plate-like members having a central area with compartmentalized indentations; tray-like structures having one centrally located food containing indentation; and compartmentalized tray-like structures.

3. The apparatus of claim 1 wherein each said elevated eating surface is selected from a group consisting of plate-like surfaces having one centrally located food-holding indentation; compartmentalized plate-like surfaces; tray-like structures with side and back walls; multi-compartmented tray-like structures; tray-like structures with a back wall, side walls, and a slightly raised front ridge adapted to help retain food items thereon during apparatus transport and food manipulation with a utensil, platforms having small capacity food-holding compartments; platforms having a substantially planar upper surface; and multi-tiered plates.

4. The apparatus of claim 1 wherein said support means is selected from a group consisting of pillar-like supports, platform-like supports, contoured supports having three dimensional relief, and supports having at least one horizontally extending crossbar therebetween adapted for providing balance and stability.

5. The apparatus of claim 4 further comprising a plurality of tabs depending outwardly from said base member each having an upper surface area sufficient for affixing one of said supports thereupon, in a substantially upright position.

6. The apparatus of claim 4 wherein said pillar-like supports and said platform-like supports are stackable for compact storage.

7. The apparatus of claim 1 wherein said support means further comprises at least one hidden compartment adapted for holding small quantities of condiments, prizes, and small toys.

8. The apparatus of claim 1 wherein said apparatus is selected from a group consisting of apparatus made as a one-piece unit by molded construction, apparatus made from modular components which are separable from one another, apparatus made from modular components having a snap-together type of connection, and apparatus made from modular components with clip-on attachment means.

9. The apparatus of claim 1 further comprising a plurality of quick-release fasteners attached to said base member, each of said quick-release fasteners being adapted for holding utensils, napkins, and small elongated toys.

10. The apparatus of claim 1 further comprising a plurality of surface markings and wherein said markings are selected from a group consisting of numerical markings, decorative markings, markings consisting of alphabet letters and words, and geometric markings.

11. The apparatus of claim 10 further comprising at least one insert adapted for vertically extending the food-holding capacity of each said elevated eating surface and wherein each said insert is selected from a group consisting of grease-resistant inserts and liquid-resistant inserts.

12. A method by which an individual is able to transport and eat a variety of food items, and wherein the individual is provided with an enlarged amount of eating surface area without an enlarged footprint, and further wherein the individual is also provided with improved food presentation as well as reduced mixing of foods items targeted for consumption which have differing moisture contents, temperature, and intensity of flavoring to maximize the original integrity of each food item prior to consumption, said method comprising the steps of:

providing a plurality of food items, a rigid base member having a top food eating surface adapted for the placement and retention of selected ones of said food items during transport of said base member, a plurality of rigid elevated eating surfaces each adapted for the placement and retention of at least one food item during transport and having a perimeter dimension smaller than said base member, and a plurality of rigid support members each having sufficient cross-sectional and height dimensions providing a hidden compartment usable for containing small toys and condiments;

selecting at least one of said elevated eating surfaces;

selecting at least one of said support members; and using said support members to connect each of said elevated eating surfaces to said base member in positions relative thereto so that each of said elevated eating surfaces is at an elevation substantially different from said base member whereby selected ones of said food items that would otherwise be stacked upon one another when served to an individual for consumption can be distributed over said base member and said elevated eating surfaces to provide a better organized presentation of said food items and less undesirable mixing of said food items without having to enlarge said base member.

13. The method of claim 12 wherein said rigid support members are selected from a group consisting of pillar-like supports configured to support a single one of said elevated eating surfaces; pillar-like supports configured to support more than one of said upper food placement surfaces; stackable pillar-like supports; pillar-like support members having at least one hidden compartment adapted for holding small quantities of condiments, prizes, and diminutive toys; contoured pillar-like support members having three dimensional relief; and further wherein said rigid elevated eating surfaces are selected from a group consisting of plate-like surfaces having one centrally located food-holding indentation; compartmentalized plate-like surfaces; tray-like structures with side and back walls; multi-compartmented tray-like structures; tray-like structures with a back wall, side walls, and a slightly raised front ridge adapted to help retain food items thereon during apparatus transport and food manipulation with a utensil; platforms having small capacity food-holding compartments; platforms having a substantially planar upper surface; and multi-tiered plates.

14. The method of claim 12 wherein said base member is selected from a group consisting of plate-like members having one centrally located food containing indentation; compartmentalized plate-like members; tray-like structures having a back wall and side walls; compartmentalized tray-like structures; and tray-like structures with a back wall, side walls, and a slightly raised front ridge adapted to help retain selected ones of said food items thereon during food transport and manipulation.

15. The method of claim 12 wherein said step of providing said base member further comprises the providing a base member having a plurality of quick-release fasteners adapted for holding utensils, napkins, and small elongated toys.

16. The method of claim 15 wherein said base member, each elevated eating surface, and said support members are selected from a group consisting of base members, elevated eating surfaces, and support members made as modular components which are separable from one another; base members, elevated eating surfaces, and support members made into a single unit by molded construction; and support members made as modular components which are separable from said base members.

17. The method of claim 16 further comprising the steps of providing of a plurality of surface markings selected from a group consisting of numerical markings, decorative markings, and geometric markings, and optionally attaching said surface markings to said base member, each said elevated eating surface, and said support members.

18. The method of claim 12 further comprising the step of providing of a plurality of inserts adapted for vertically extending the food-holding capacity of each said elevated eating surface, wherein said inserts are selected from a group consisting of grease-resistant inserts and liquid-resistant inserts, and also comprising the step of positioning one of said inserts within each said elevated eating surface.

19. The method of claim 12 further comprising the step of providing a plurality of tabs adapted for receipt of one of said rigid support members and support thereof in a substantially upright position, and the step of attaching selected ones of said tabs to said base member so that each said tab thereafter depends outwardly from said base member.

* * * * *